US012703817B2

(12) United States Patent
Yana Motta et al.

(10) Patent No.: US 12,703,817 B2
(45) Date of Patent: Aug. 11, 2026

(54) HEAT TRANSFER COMPOSITIONS, METHODS, AND SYSTEMS

(71) Applicant: HONEYWELL INTERNATIONAL INC., Charlotte, NC (US)

(72) Inventors: Samuel F. Yana Motta, Charlotte, NC (US); Ankit Sethi, Charlotte, NC (US); Yang Zou, Charlotte, NC (US)

(73) Assignee: Solstice Advanced Materials US, Inc., Morris Plains, NJ (US)

( * ) Notice: Subject to any disclaimer, the term of this patent is extended or adjusted under 35 U.S.C. 154(b) by 99 days.

(21) Appl. No.: 18/399,063

(22) Filed: Dec. 28, 2023

(65) Prior Publication Data

US 2024/0263059 A1 Aug. 8, 2024

Related U.S. Application Data

(63) Continuation of application No. 17/556,548, filed on Dec. 20, 2021, now abandoned, which is a (Continued)

(51) Int. Cl.
*C09K 5/04* (2006.01)
*C10M 107/24* (2006.01)

(Continued)

(52) U.S. Cl.
CPC .......... *C09K 5/044* (2013.01); *C10M 107/24* (2013.01); *C10M 107/32* (2013.01);

(Continued)

(58) Field of Classification Search
CPC .......... C09K 5/044; C09K 5/045; C09K 5/04; C09K 5/048; C09K 5/042; C09K 2205/12;

(Continued)

(56) References Cited

U.S. PATENT DOCUMENTS

| | | | |
|---|---|---|---|
| 11,732,170 B2 | 8/2023 | Smith | |
| 2010/0044619 A1* | 2/2010 | Hulse | C09K 3/30 252/67 |

(Continued)

FOREIGN PATENT DOCUMENTS

| | | |
|---|---|---|
| CN | 101415793 | 4/2009 |
| CN | 101665681 | 3/2010 |

(Continued)

OTHER PUBLICATIONS

US 6,156,225 A, 12/2000, Minor (withdrawn)
International Search Report from PCT/US2019/015884 dated May 15, 2019; 11 pages.

*Primary Examiner* — Frantz F Jules
(74) *Attorney, Agent, or Firm* — FisherBroyles, LLP

(57) ABSTRACT

The present invention relates to a refrigerant composition, including difluoromethane (HFC-32), pentafluoroethane (HFC-125), and trifluoroiodomethane ($CF_3I$) for use in a heat exchange system, including air conditioning and refrigeration applications and in particular aspects to the use of such compositions as a replacement of the refrigerant R-410A for heating and cooling applications and to retrofitting heat exchange systems, including systems designed for use with R-410A.

17 Claims, 1 Drawing Sheet

Related U.S. Application Data continuation of application No. 16/262,570, filed on Jan. 30, 2019, now abandoned.

(60) Provisional application No. 62/631,093, filed on Feb. 15, 2018, provisional application No. 62/623,887, filed on Jan. 30, 2018.

(51) Int. Cl.

| | |
|---|---|
| ***C10M 107/32*** | (2006.01) |
| ***C10M 171/00*** | (2006.01) |
| *C10N 20/00* | (2006.01) |
| *C10N 40/30* | (2006.01) |
| *F25B 9/00* | (2006.01) |
| *F25B 31/00* | (2006.01) |

(52) U.S. Cl.

CPC ..... *C10M 171/008* (2013.01); *C09K 2205/12* (2013.01); *C09K 2205/122* (2013.01); *C09K 2205/22* (2013.01); *C10M 2203/065* (2013.01); *C10M 2207/026* (2013.01); *C10M 2207/2835* (2013.01); *C10M 2209/043* (2013.01); *C10M 2209/1023* (2013.01); *C10N 2020/101* (2020.05); *C10N 2040/30* (2013.01); *F25B 9/006* (2013.01); *F25B 31/002* (2013.01)

(58) Field of Classification Search

CPC .......... C09K 2205/122; C09K 2205/22; C09K 2205/128; C10M 107/24; C10M 107/32; C10M 171/008; C10M 2203/065; C10M 2207/026; C10M 2207/2835; C10M 2209/043; C10M 2209/1023; C10N 2020/101; C10N 2040/30; F25B 9/006; F25B 31/002

See application file for complete search history.

(56) References Cited

U.S. PATENT DOCUMENTS

| | | | | |
|---|---|---|---|---|
| 2010/0234256 | A1 | 9/2010 | Sato | |
| 2010/0257881 | A1 | 10/2010 | Perti | |
| 2012/0204594 | A1 | 8/2012 | Singh | |
| 2013/0207024 | A1* | 8/2013 | Takigawa | C09K 5/045 252/68 |
| 2014/0048737 | A1 | 2/2014 | Singh | |
| 2017/0321099 | A1* | 11/2017 | Sethi | C09K 5/045 |
| 2020/0131418 | A1* | 4/2020 | Smith | C10M 105/50 |

FOREIGN PATENT DOCUMENTS

| | | | | |
|---|---|---|---|---|
| CN | 101796155 | | 8/2010 | |
| CN | 105038719 | A * | 11/2015 | |
| CN | 110699043 | | 1/2020 | |
| ES | 2550385 | T3 * | 11/2015 | C08J 9/146 |
| JP | H08277389 | | 10/1996 | |
| JP | 2021511425 | | 5/2021 | |
| WO | 2007126414 | A2 | 11/2007 | |
| WO | 2008033568 | | 3/2008 | |
| WO | 2019138594 | | 7/2019 | |

* cited by examiner

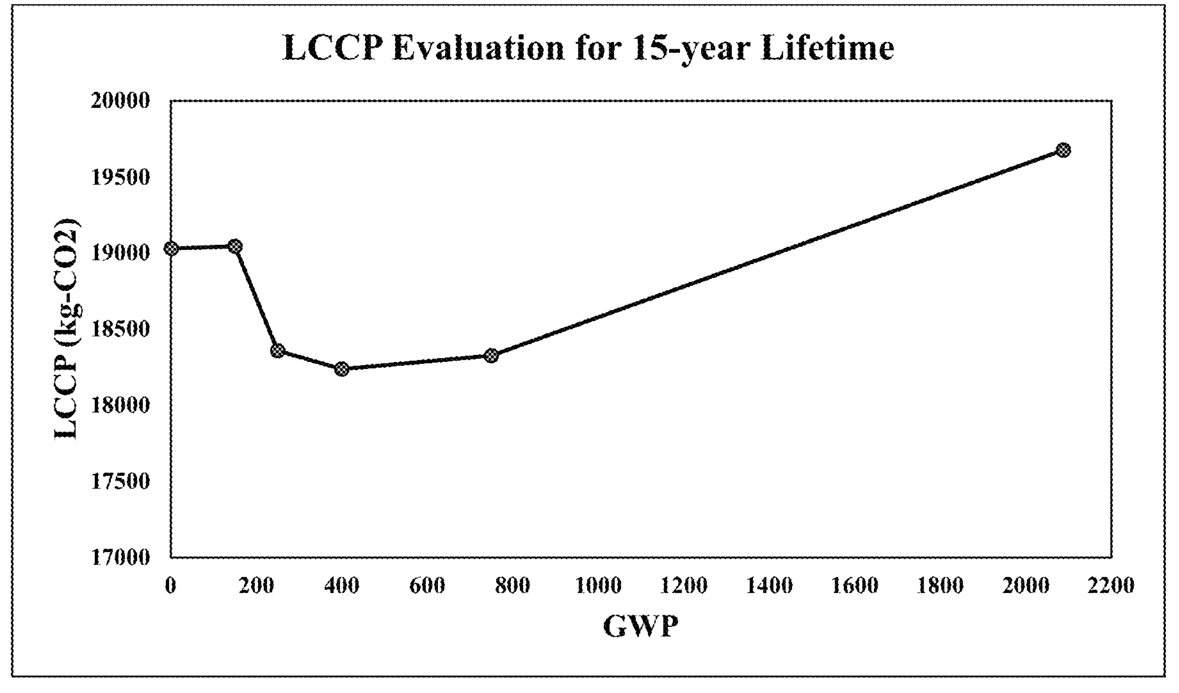
LCCP Evaluation for 15-year Lifetime
LCCP (kg-CO2)
20000
19500
19000
18500
18000
17500
17000
0
200
400
600
800
1000
1200
1400
1600
1800
2000
2200
GWP

HEAT TRANSFER COMPOSITIONS, METHODS, AND SYSTEMS

CROSS REFERENCE TO RELATED APPLICATIONS

This application is a continuation of U.S. application Ser. No. 17/556,548, filed Dec. 20, 2021, which is a continuation of U.S. application Ser. No. 16/262,570, filed Jan. 30, 2019, which claims the priority benefit of U.S. Provisional 62/623,887, filed Jan. 30, 2018, which is incorporated herein by reference in its entirety.

The present application claims the priority benefit of U.S. Provisional 62/631,093, filed Feb. 15, 2018, which is incorporated herein by reference in its entirety.

FIELD OF THE INVENTION

The present invention relates to compositions, methods and systems having utility in heat transfer applications, including in air conditioning and refrigeration applications. In particular aspects, the invention relates to compositions useful in heat transfer systems of the type in which the refrigerant R-410A would have been used. The compositions of the invention are useful in particular as a replacement of the refrigerant R-410A for heating and cooling applications and to retrofitting heat exchange systems, including systems designed for use with R-410A.

BACKGROUND

Mechanical refrigeration systems, and related heat transfer devices, such as heat pumps and air conditioners are well known in the art for industrial, commercial and domestic uses. Chlorofluorocarbons (CFCs) were developed in the 1930s as refrigerants for such systems. However, since the 1980s, the effect of CFCs on the stratospheric ozone layer has become the focus of much attention. In 1987, a number of governments signed the Montreal Protocol to protect the global environment, setting forth a timetable for phasing out the CFC products. CFCs were replaced with more environmentally acceptable materials that contain hydrogen, namely the hydrochlorofluorocarbons (HCFCs).

One of the most commonly used hydrochlorofluorocarbon refrigerants was chlorodifluoromethane (HCFC-22). However, subsequent amendments to the Montreal protocol accelerated the phase out of the CFCs and scheduled the phase-out of HCFCs, including HCFC-22.

In response to the need for a non-flammable, non-toxic alternative to the CFCs and HCFCs, industry has developed a number of hydrofluorocarbons (HFCs) which have zero ozone depletion potential. R-410A (a 50:50 w/w blend of difluoromethane (HFC-32) and pentafluoroethane (HFC-125)) was adopted as the industry replacement for HCFC-22 in air conditioning and chiller applications as it does not contribute to ozone depletion. However, R-410A is not a drop-in replacement for R-22. Thus, the replacement of R-22 with R-410A required the redesign of major components within heat exchange systems, including the replacement and redesign of the compressor to accommodate the substantially higher operating pressure and volumetric capacity of R-410A, when compared with R-22.

While R-410A has a more acceptable Ozone Depleting Potential (ODP) than R-22, the continued use of R-410A is problematic since it has a high Global Warming Potential of 2088. There is therefore a need in the art for the replacement of R-410A with a more environmentally acceptable alternative.

The EU implemented the F-gas regulation to limit HFCs which can be placed on the market in the EU from 2015 onwards, as shown in Table 1. By 2030, only 21% of the quantity of HFCs that were sold in 2015 will be available. Therefore, it is desired to limit GWP below 427 as a long term solution.

TABLE 1

| F-Gas Regulation | | |
|---|---|---|
| Year | Phasedown Percentage | GWP Level |
| 2015 | 100% | 2034* |
| 2016-2017 | 93% | 1891 |
| 2018-2020 | 63% | 1281 |
| 2021-2023 | 45% | 915 |
| 2024-2026 | 31% | 630 |
| 2027-2029 | 24% | 488 |
| After 2030 | 21% | 427 |

*2015 GWP level is based on UNEP 2012 Use Study with no growth rate.

It is understood in the art that it is highly desirable for a replacement heat transfer fluid to possess a difficult to achieve mosaic of properties including excellent heat transfer properties (and in particular heat transfer properties that are well matched to the needs of the particular application), chemical stability, low or no toxicity, non-flammability, lubricant miscibility and/or lubricant compatibility amongst others. In addition, any replacement for R-410A would ideally be a good match for the operating conditions of R-410A in order to avoid modification or redesign of the system. The development of a heat transfer fluid meeting all of these requirements, many of which are unpredictable, is a significant challenge.

With regard to efficiency in use, it is important to note that a loss of thermodynamic performance or energy efficiency may result in an increase in fossil fuel usage as a result of the increased demand for electrical energy. The use of such refrigerant will therefore have a negative secondary environmental impact.

Flammability is considered to be an important property for many heat transfer applications. As used herein, the term "non-flammable" refers to compounds or compositions which are determined to be non-flammable in accordance with ASTM standard E-681-2009 Standard Test Method for Concentration Limits of Flammability of Chemicals (Vapors and Gases) at conditions described in ASHRAE Standard 34-2016 Designation and Safety Classification of Refrigerants and described in Appendix B1 to ASHRAE Standard 34-2016, which is incorporated herein by reference and referred to herein for convenience as "Non-Flammability Test".

It is very important for maintenance of system efficiency, and proper and reliable functioning of the compressor, that lubricant circulating in a vapor compression heat transfer system is returned to the compressor to perform its intended lubricating function. Otherwise, lubricant might accumulate and become lodged in the coils and piping of the system, including in the heat transfer components. Furthermore, when lubricant accumulates on the inner surfaces of the evaporator, it lowers the heat exchange efficiency of the evaporator, and thereby reduces the efficiency of the system.

R-410A is currently commonly used with polyol ester (POE) lubricating oil in air conditioning applications, as R-410A is miscible with POE at temperatures experienced during use of such systems. However, R-410A is immiscible with POE at temperatures typically experienced during operation of low temperature refrigeration systems, and heat pump systems. Therefore, unless steps are taken to mitigate against this immiscibility, POE and R-410A cannot be used in low temperature refrigeration or heat pump systems.

Applicants have come to appreciate that it is therefore desirable to be able to provide compositions which are capable of being used as a replacement for R-410A in air conditioning applications, and in particular in residential air conditioning and commercial air conditioning applications, which include, rooftop air conditioning, variable refrigerant flow (VRF) air conditioning and chiller air conditioning applications. Applicants have also come to appreciate that the compositions, methods and systems of the invention have advantage in, for example, heat pump and low temperature refrigeration systems, wherein the drawback of immiscibility with POE at temperatures experienced during operation of these systems is eliminated.

SUMMARY

The present invention includes refrigerant compositions which can be used as a replacement for R-410A and which exhibit in preferred embodiments compositions the desired mosaic of properties of excellent heat transfer properties, chemical stability, low or no toxicity, non-flammability, lubricant miscibility and lubricant compatibility in combination with low Global Warming Potential (GWP) and near zero ODP.

The present invention includes refrigerants comprising at least about 97% by weight of the following three compounds, with each compound being present in the following relative percentages:

39 to 45% by weight difluoromethane (HFC-32),
1 to 4% by weight pentafluoroethane (HFC-125), and
51 to 57% by weight trifluoroiodomethane ($CF_3I$). The refrigerant according to this paragraph is referred to herein for convenience as Refrigerant 1.

As used herein with respect to percentages based on a list of identified compounds the term "relative percentage" means the percentage of the identified compound based on the total weight of the listed compounds.

As used herein with respect to weight percentages, the term "about" with respect to an amount of an identified component means the amount of the identified component can vary by an amount of ±1% by weight.

The present invention also includes refrigerants comprising at least about 98.5% by weight of the following three compounds, with each compound being present in the following relative percentages:

39 to 45% by weight difluoromethane (HFC-32),
1 to 4% by weight pentafluoroethane (HFC-125), and
51 to 57% by weight trifluoroiodomethane ($CF_3I$). The refrigerant according to this paragraph is referred to herein for convenience as Refrigerant 2.

The present invention includes refrigerants comprising at least about 99.5% by weight of the following three compounds, with each compound being present in the following relative percentages:

39 to 45% by weight difluoromethane (HFC-32),
1 to 4% by weight pentafluoroethane (HFC-125), and
51 to 57% by weight trifluoroiodomethane ($CF_3I$). The refrigerant according to this paragraph is referred to herein for convenience as Refrigerant 3.

The present invention includes refrigerants consisting essentially of the following three compounds, with each compound being present in the following relative percentages:

39 to 45% by weight difluoromethane (HFC-32),
1 to 4% by weight pentafluoroethane (HFC-125), and
51 to 57% by weight trifluoroiodomethane ($CF_3I$). The refrigerant according to this paragraph is referred to herein for convenience as Refrigerant 4.

The present invention includes refrigerants consisting of the following three compounds, with each compound being present in the following relative percentages:

39 to 45% by weight difluoromethane (HFC-32),
1 to 4% by weight pentafluoroethane (HFC-125), and
51 to 57% by weight trifluoroiodomethane ($CF_3I$), wherein the refrigerant is non-flammable according to the Non-Flammability Test. The refrigerant according to this paragraph is referred to herein for convenience as Refrigerant 5.

The present invention includes refrigerants comprising at least about 97% by weight of the following three compounds, with each compound being present in the following relative percentages:

about 41 to about 43% by weight difluoromethane (HFC-32),
1 to 4% by weight pentafluoroethane (HFC-125), and
about 53 to about 56% by weight trifluoroiodomethane ($CF_3I$). The refrigerant according to this paragraph is referred to herein for convenience as Refrigerant 6.

The present invention includes refrigerants comprising at least about 98.5% by weight of the following three compounds, with each compound being present in the following relative percentages:

about 41 to about 43% by weight difluoromethane (HFC-32),
1 to 4% by weight pentafluoroethane (HFC-125), and
about 53 to about 56% by weight trifluoroiodomethane ($CF_3I$). The refrigerant according to this paragraph is referred to herein for convenience as Refrigerant 7.

The present invention includes refrigerants comprising at least about 99.5% by weight of the following three compounds, with each compound being present in the following relative percentages:

about 41 to about 43% by weight difluoromethane (HFC-32),
1 to 4% by weight pentafluoroethane (HFC-125), and
about 53 to about 56% by weight trifluoroiodomethane ($CF_3I$). The refrigerant according to this paragraph is referred to herein for convenience as Refrigerant 8.

The present invention includes refrigerants consisting essentially of the following three compounds, with each compound being present in the following relative percentages:

about 41 to about 43% by weight difluoromethane (HFC-32),
1 to 4% by weight pentafluoroethane (HFC-125), and
about 53 to about 56% by weight trifluoroiodomethane ($CF_3I$). The refrigerant according to this paragraph is referred to herein for convenience as Refrigerant 9.

The present invention includes refrigerants consisting of the following three compounds, with each compound being present in the following relative percentages:

about 41 to about 43% by weight difluoromethane (HFC-32),
1 to 4% by weight pentafluoroethane (HFC-125), and
about 53 to about 56% by weight trifluoroiodomethane ($CF_3I$) wherein the refrigerant is non-flammable according to the Non-Flammability Test defined below. The refrigerant according to this paragraph is referred to herein for convenience as Refrigerant 10.

The present invention includes refrigerants comprising at least about 97% by weight of the following three compounds, with each compound being present in the following relative percentages:

41%±1% by weight difluoromethane (HFC-32), 3.5%±0.5% by weight pentafluoroethane (HFC-125), and 55.5%±0.5% by weight trifluoroiodomethane ($CF_3I$). The refrigerant according to this paragraph is referred to herein for convenience as Refrigerant 11.

The present invention includes refrigerants comprising at least about 98.5% by weight of the following three compounds, with each compound being present in the following relative percentages:

41%±1% by weight difluoromethane (HFC-32), 3.5%±0.5% by weight pentafluoroethane (HFC-125), and 55.5%±0.5% by weight trifluoroiodomethane ($CF_3I$). The refrigerant according to this paragraph is referred to herein for convenience as Refrigerant 12.

The present invention includes refrigerants comprising at least about 99.5% by weight of the following three compounds, with each compound being present in the following relative percentages:

41%±1% by weight by weight difluoromethane (HFC-32), 3.5%±0.5% by weight pentafluoroethane (HFC-125), and 55.5%±0.5% by weight trifluoroiodomethane ($CF_3I$). The refrigerant according to this paragraph is referred to herein for convenience as Refrigerant 13.

The present invention includes refrigerants consisting essentially of the following three compounds, with each compound being present in the following relative percentages:

41%±1% by weight difluoromethane (HFC-32), 3.5%±0.5% by weight pentafluoroethane (HFC-125), and 55.5%±0.5% by weight trifluoroiodomethane ($CF_3I$). The refrigerant according to this paragraph is referred to herein for convenience as Refrigerant 14.

The present invention includes refrigerants consisting of the following three compounds, with each compound being present in the following relative percentages:

41%±1% by weight difluoromethane (HFC-32), 3.5%±0.5% by weight pentafluoroethane (HFC-125), and 55.5%±0.5% by weight trifluoroiodomethane ($CF_3I$), wherein the refrigerant is non-flammable according to the Non-Flammability Test. The refrigerant according to this paragraph is referred to herein for convenience as Refrigerant 15.

Refrigerants comprising at least about the percentage by weight of the three compounds indicated in the following table and wherein each compound is present in the following relative percentages in any one of Refrigerants 16 to 18:

| REFRIGERANT | at least % by weight of the following three compounds | HFC-32 (% by weight) | HFC-125 (% by weight) | $CF_3I$ (% by weight) |
|---|---|---|---|---|
| Refrigerant 16 | 97 | 41 ± 0.3 | 3.5 ± 0.3 | 55.5 ± 0.5 |
| Refrigerant 17 | 98.5 | 41 ± 0.3 | 3.5 ± 0.3 | 55.5 ± 0.5 |
| Refrigerant 18 | 99.5 | 41 ± 0.3 | 3.5 ± 0.3 | 55.5 ± 0.5 |

The present invention includes refrigerants consisting essentially of the following three compounds, with each compound being present in the following relative percentages:

41%±0.3% by weight difluoromethane (HFC-32), 3.5%±0.3% by weight pentafluoroethane (HFC-125), and 55.5%±0.3% by weight trifluoroiodomethane ($CF_3I$). The refrigerant according to this paragraph is referred to herein for convenience as Refrigerant 19.

The present invention includes refrigerants consisting of the following three compounds, with each compound being present in the following relative percentages:

41%±0.3% by weight difluoromethane (HFC-32), 3.5%±0.3% by weight pentafluoroethane (HFC-125), and 55.5%±0.3% by weight trifluoroiodomethane ($CF_3I$), wherein the refrigerant is non-flammable according to the Non-Flammability Test. The refrigerant according to this paragraph is referred to herein for convenience as Refrigerant 20.

Refrigerants comprising at least about the percentage by weight of the three compounds indicated in the following table and wherein each compound is present in the following relative percentages in any one of Refrigerants 21 to 23:

| REFRIGERANT | at least % by weight of the following three compounds | HFC-32 (% by weight) | HFC-125 (% by weight) | $CF_3I$ (% by weight) |
|---|---|---|---|---|
| Refrigerant 21 | 97 | 41 | 3.5 | 55.5 |
| Refrigerant 22 | 98.5 | 41 | 3.5 | 55.5 |
| Refrigerant 23 | 99.5 | 41 | 3.5 | 55.5 |

The present invention includes refrigerants consisting essentially of the following three compounds, with each compound being present in the following relative percentages:

41% by weight difluoromethane (HFC-32), 3.5% by weight pentafluoroethane (HFC-125), and 55.5% by weight trifluoroiodomethane (CF3I). The refrigerant according to this paragraph is referred to herein for convenience as Refrigerant 24.

The present invention includes refrigerants consisting of the following three compounds, with each compound being present in the following relative percentages:

41% by weight difluoromethane (HFC-32), 3.5% by weight pentafluoroethane (HFC-125), and 55.5% by weight trifluoroiodomethane ($CF_3I$), wherein the refrigerant is non-flammable according to the Non-Flammability Test. The refrigerant according to this paragraph is referred to herein for convenience as Refrigerant 25.

BRIEF DESCRIPTION OF THE FIGURE

FIG. 1 shows the LCCP of one of the refrigerants of the present invention and certain known refrigerants.

DETAILED DESCRIPTION OF THE INVENTION

Applicants have found that the refrigerants of the present invention, including Refrigerants 1-25 as described herein, are capable of providing exceptionally advantageous properties and in particular non-flammability, especially with the use of any one of Refrigerants 1 to 25 of the present invention as a replacement for R-410A.

A particular advantage of Refrigerants 1-25 of the present invention in preferred compositions is that they are non-flammable, as defined hereinafter. Thus, it is a desire in the art to provide a refrigerant composition which can be used as a replacement for R-410A and which has excellent heat transfer properties, low environmental impact (including particularly low GWP and near zero ODP) chemical stability, low or no toxicity, and/or lubricant compatibility and which maintains non-flammability in use. This desirable advantage can be achieved by the Refrigerants 1-25 of the present invention.

The present invention includes heat transfer compositions that include a refrigerant of the present invention, including particularly any of Refrigerants 1-25, and preferably, the heat transfer compositions of the present invention comprise a refrigerant of the present invention in an amount of greater than 40% by weight of the heat transfer composition or greater than about 50% by weight of the heat transfer composition, or greater than 70% by weight of the heat transfer composition, or greater than 80% by weight of the heat transfer composition or greater than 90% by weight of the heat transfer composition. The heat transfer composition may consist essentially of or consist of a refrigerant according to the present invention, including any of Refrigerants 1-25.

The heat transfer compositions of the invention may include other components for the purpose of enhancing or providing certain functionality to the compositions. Such other components or additives may include one or more of stabilizers, lubricants, dyes, solubilizing agents, compatibilizers, antioxidants, corrosion inhibitors, extreme pressure additives, and anti wear additives.

Definitions

For the purposes of this invention, the term "about" in relation to temperatures in degrees centigrade (° C.) means that the stated temperature can vary by an amount of +/−5° C. In preferred embodiments, temperature specified as being about is preferably +/−2° C., more preferably +/−1° C., and even more preferably +/−0.5° C. of the identified temperature The term "capacity" is the amount of cooling provided, in BTUs/hr, by the refrigerant in the refrigeration system. This is experimentally determined by multiplying the change in enthalpy in BTU/lb, of the refrigerant as it passes through the evaporator by the mass flow rate of the refrigerant. The enthalpy can be determined from the measurement of the pressure and temperature of the refrigerant. The capacity of the refrigeration system relates to the ability to maintain an area to be cooled at a specific temperature. The capacity of a refrigerant represents the amount of cooling or heating that it provides and provides some measure of the capability of a compressor to pump quantities of heat for a given volumetric flow rate of refrigerant. In other words, given a specific compressor, a refrigerant with a higher capacity will deliver more cooling or heating power.

The phrase "coefficient of performance" (hereinafter "COP") is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration or cooling capacity to the energy applied by the compressor in compressing the vapor and therefore expresses the capability of a given compressor to pump quantities of heat for a given volumetric flow rate of a heat transfer fluid, such as a refrigerant. In other words, given a specific compressor, a refrigerant with a higher COP will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988 which is incorporated herein by reference in its entirety). The phrase "discharge temperature" refers to the temperature of the refrigerant at the outlet of the compressor. The advantage of a low discharge temperature is that it permits the use of existing equipment without activation of the thermal protection aspects of the system which are preferably designed to protect compressor components and avoids the use of costly controls such as liquid injection to reduce discharge temperature.

The phrase "Global Warming Potential" (hereinafter "GWP") was developed to allow comparisons of the global warming impact of different gases. Specifically, it is a measure of how much energy the emission of one ton of a gas will absorb over a given period of time, relative to the emission of one ton of carbon dioxide. The larger the GWP, the more that a given gas warms the Earth compared to $CO_2$ over that time period. The given time period used for GWP is 100 years. GWP provides a common measure, which allows analysts to add up emission estimates of different gases. See www.epa.gov. GWP as used herein includes the 100 year given time period.

The phrase "Life Cycle Climate Performance" (hereinafter "LCCP") is a method by which air conditioning and refrigeration systems can be evaluated for their global warming impact over the course of their lifetime. LCCP includes the direct impacts of refrigerant emissions and the indirect impacts of energy consumption used to operate the system, energy to manufacture the system, and transport and safely dispose of the system. The direct impacts of refrigerant emissions are obtained from the refrigerant's GWP value. For the indirect emissions, the measured refrigerant properties are used to obtain the system performance and energy consumption. LCCP is determined by using Equations 1 and 2 as follows. Equation 1 is Direct Emissions=Refrigerant Charge (kg)×(Annual Loss Rate×Lifetime+End-of-Life Loss)×GWP. Equation 2 is Indirect Emissions=Annual Power Consumption×Lifetime×$CO_2$ per kW-hr of electrical production. The Direct Emissions as determined by Equation 1 and the Indirect Emissions as determined by Equation 2 are added together to provide the LCCP. TMY2 and TMY3 data produced by the National Renewable Laboratory and available in BinMaker® Pro Version 4 Software is used for the analysis. The GWP values reported in the Intergovernmental Panel on Climate Change (IPCC)'s Assessment Report 4 (AR4) 2007 are used for the calculations. LCCP is expressed as carbon dioxide mass (kg-$CO_{2eq}$) over the lifetime of the air conditioning or refrigeration systems.

The term "mass flow rate" is the mass of refrigerant passing through a conduit per unit of time.

The term "nonflammable" refers to compounds or compositions which are determined to be nonflammable as determined in accordance with ASTM standard E-681-2009 Standard Test Method for Concentration Limits of Flammability of Chemicals (Vapors and Gases) at conditions described in ASHRAE Standard 34-2016 Designation and Safety Classification of Refrigerants and described in Appendix B1 to ASHRAE Standard 34-2016, which is incorporated herein by reference in its entirety ("Non-Flammability Test"). Flammability is defined as the ability of a composition to ignite and/or propagate a flame. Under this test, flammability is determined by measuring flame angles.

The term "Occupational Exposure Limit (OEL)" is determined in accordance with ASHRAE Standard 34-2016 Designation and Safety Classification of Refrigerants.

As the term is used herein, "replacement for" with respect to a particular heat transfer composition or refrigerant of the present invention as a "replacement for" a particular prior refrigerant means the use of the indicated composition of the present invention in a heat transfer system that heretofore had been commonly used with that prior refrigerant. By way of example, when a refrigerant or heat transfer composition of the present invention is used in a heat transfer system that has heretofore been designed for and/or commonly used with R410A, such as residential air conditioning and commercial air conditioning (including roof top systems, variable refrigerant flow (VRF) systems and chiller systems) then the present refrigerant is a replacement for R410A is such systems.

The phrase "thermodynamic glide" applies to zeotropic refrigerant mixtures that have varying temperatures during phase change processes in the evaporator or condenser at constant pressure.

Refrigerants and Heat Transfer Compositions

Applicants have found that the refrigerants of the present invention, including each of Refrigerants 1-25 as described herein, are capable of providing exceptionally advantageous properties and in particular non-flammability, especially with the use of the refrigerant of the present invention as a replacement for R-410A and especially in prior 410A residential air conditioning systems, and prior R-410A commercial air conditioning systems (including prior R-410A roof top systems, prior R-410A variable refrigerant flow (VRF) systems and prior R-410A chiller systems).

A particular advantage of the refrigerants of the present invention is that they are non-flammable when tested in accordance with the Non-Flammability Test, and as mentioned above there has been a desire in the art to provide refrigerants and heat transfer compositions which can be used as a replacement for R-410A in various systems, and which has excellent heat transfer properties, low environmental impact (including particularly low GWP and near zero ODP), excellent chemical stability, low or no toxicity, and/or lubricant compatibility and which maintains non-flammability in use. This desirable advantage can be achieved by refrigerants and heat transfer compositions of the present invention.

Preferably, the heat transfer compositions comprise any refrigerant of the present invention, including each of Refrigerants 1-25, include refrigerant in an amount of greater than 40% by weight of the heat transfer composition.

Preferably, the heat transfer compositions any refrigerant of the present invention, including each of Refrigerants 1-25, include refrigerant in an amount of greater than 50% by weight of the heat transfer composition.

Preferably, the heat transfer compositions any refrigerant of the present invention, including each of Refrigerants 1-25, include refrigerant in an amount of greater than 70% by weight of the heat transfer composition.

Preferably, the heat transfer compositions any refrigerant of the present invention, including each of Refrigerants 1-25, include refrigerant in an amount of greater than 80% by weight of the heat transfer composition.

Preferably, the heat transfer compositions any refrigerant of the present invention, including each of Refrigerants 1-25, include refrigerant in an amount of greater than 90% by weight of the heat transfer composition.

Applicants have found that the refrigerants according to the present invention, including each of Refrigerants 1-25, and the heat transfer compositions containing any of such refrigerant of the invention, are capable of achieving a difficult to achieve combination of properties including particularly low GWP. Thus, the refrigerants according to the present invention and the heat transfer compositions of the invention have a GWP of not greater than about 427 and preferably the GWP is from about 250 to less than 427.

In addition, the refrigerants according to the present invention, including each of Refrigerants 1-25, and the heat transfer compositions containing any of such refrigerant of the invention, have a low Ozone Depletion Potential (ODP). Thus, the refrigerants according to the present invention and heat transfer compositions of the invention have an Ozone Depletion Potential (ODP) of not greater than 0.05, preferably not greater than 0.02, more preferably about zero.

In addition, the refrigerants according to the present invention, including each of Refrigerants 1-25, and the heat transfer compositions containing any of such refrigerant of the invention, show acceptable toxicity and preferably have an Occupational Exposure Limit (OEL) of greater than about 400.

The heat transfer compositions of the invention may include other components for the purpose of enhancing or providing certain functionality to the compositions, preferably without negating the enhanced properties provided in accordance with present invention. Such other components or additives may include stabilizers, lubricants, Stabilizers:

The heat transfer composition of the invention particularly comprises a refrigerant a refrigerant as discussed herein, including each of Refrigerants 1-25, and a stabilizer.

The stabilizer component(s) preferably are provided in the heat transfer composition in an amount of greater than 0 to about 15% by weight of the heat transfer composition, or from about 0.5 to about 10, with the percentages being based on the total weight of all stabilizers in the heat transfer composition divided by the total of all components in the heat transfer composition.

The stabilizer for use in the heat transfer compostions of the present invention includes a combination of: (i) at least one alkylated naphthalene compound and (ii) at least one phenol-based compound. The stabilizer according to this paragraph is sometimes referred to herein for convenience as Stabilizer 1.

The stabilizer for use in the heat transfer compostions of the present invention includes at least one of: (i) alkylated naphthalene compound(s); (ii) phenol-based compound(s); and (iii) diene-based compound(s). The stabilizer according to this paragraph is sometimes referred to herein for convenience as Stabilizer 2.

The stabilizer for use in the heat transfer compostions of the present invention includes a combination of: (i) at least one alkylated naphthalene compound and (ii) at least diene-based compound. The stabilizer according to this paragraph is sometimes referred to herein for convenience as Stabilizer 3.

The stabilizer for use in the heat transfer compostions of the present invention includes a combination of: (i) at least one alkylated naphthalene compound and (ii) isobutylene compound. The stabilizer according to this paragraph is sometimes referred to herein for convenience as Stabilizer 4.

The stabilizer for use in the heat transfer compostions of the present invention includes a combination of: (i) at least one alkylated naphthalene compound and (ii) at least one phenol-based compound; and (iii) at least one diene-based compound. The stabilizer according to this paragraph is sometimes referred to herein for convenience as Stabilizer 5.

The stabilizer may include also phosphorus compound(s) and/or nitrogen compound(s) and/or epoxide(s), wherein if present the epoxide is preferably selected from the group consisting of aromatic epoxides, alkyl epoxides, alkyenyl epoxides.

The stabilizer for use in the heat transfer compostions of the present invention includes a combination of: (i) at least one alkylated naphthalene compound and (ii) at least one phenol-based compound; and (iii) at least one epoxide. The stabilizer according to this paragraph is sometimes referred to herein for convenience as Stabilizer 6.

The stabilizer for use in the heat transfer compostions of the present invention includes a combination of: (i) at least one alkylated naphthalene compound and (ii) at least one phenol-based compound; and (iii) at least one epoxide selected from the group consisting of aromatic epoxides, alkyl epoxides, alkyenyl epoxides. The stabilizer according to this paragraph is sometimes referred to herein for convenience as Stabilizer 7.

The stabilizer may consist essentially of one or more alkylated naphthalenes, one or more epoxides and one or more phenol-based compounds. The stabilizer according to this paragraph is sometimes referred to herein for convenience as Stabilizer 8.

Alkylated Naphthalenes

Applicants have surprisingly and unexpectedly found that alkylated napthalenes are highly effective as stabilizers for the heat transfer compositions of the present invention. As used herein, the term "alkylated naphthalene" refers to compounds having the following structure:

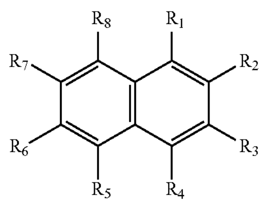

where each $R_1$-$R_8$ is independently selected from linear alkyl group, a branched alkyl group and hydrogen. The particular length of the alkyl chains and the mixtures or branched and straight chains and hydrogens can vary within the scope of the present invention, and it will be appreciated and understood by those skilled in the art that such variation is reflected the physical properties of the alkylated naphthalene, including in particular the viscosity of the alkylated compound, and producers of such materials frequently define the materials by reference to one or more of such properties as an alternative the specification of the particular R groups.

Applicants have found unexpected, surprising and advantageous results are associated the use of alkylated naphthalene as a stabilizer according to the present invention having the following properties, and alkylated naphthalene compounds having the indicated properties are referred to for convenience herein as Alkylated Napthalene 1-Alylated Napthalene 4 (AN1-AN4) as indicated respectively in rows 1-5 in the Table AN1 below:

TABLE AN1

| Property | Alkylated Napthalene 1 (AN1) | Alkylated Napthalene 2 (AN2) | Alkylated Napthalene 3 (AN3) | Alkylated Napthalene 4 (AN4) | Alkylated Napthalene 5 (AN5) |
|---|---|---|---|---|---|
| Viscosity @ 40° C. (ASTM D445), cSt | 20-200 | 20-100 | 20-50 | 30-40 | about 36 |
| Viscosity @ 100° C. (ASTM D445), cSt | 3-20 | 3-10 | 3-8 | 5-7 | about 5.6 |
| Pour Point (ASTM D97), ° C. | −50 to −20 | −45 to −25 | −40 to −30 | −35 to −30 | about −33 |

As used herein in connection with viscosity at 40° C. measured according to ASTM D445, the term "about" means+/−4 cSt.

As used herein in connection with viscosity at 100° C. measured according to ASTM D445, the term "about" means+/−0.4 cSt.

As used herein in connection with pour point as measured according to ASTM D97, the term "about" means+/−5° C.

Applicants have also found that unexpected, surprising and advantageous results are associated the use of alkylated naphthalene as a stabilizer according to the present invention having the following properties, and alkylated naphthalene compounds having the indicated properties are referred to for convenience herein as Alkylated Napthalene 6-Alkylated Napthalene 10 (AN6-AN10) as indicated respectively in rows 6-10 in the Table AN2 below:

TABLE AN2

| Property | Alkylated Napthalene 6 (AN6) | Alkylated Napthalene 7 (AN7) | Alkylated Napthalene 8 (AN8) | Alkylated Napthalene 9 (AN9) | Alkylated Napthalene 10 (AN10) |
|---|---|---|---|---|---|
| Viscosity @ 40° C. (ASTM D445), cSt | 20-200 | 20-100 | 20-50 | 30-40 | about 36 |
| Viscosity @ 100° C. (ASTM D445), cSt | 3-20 | 3-10 | 3-8 | 5-7 | about 5.6 |
| Aniline Point (ASTM D611), ° C. | 40-110 | 50-90 | 50-80 | 60-70 | about 36 |
| Noack Volatility CEC L40 (ASTM D6375), wt % | 1-50 | 5-30 | 5-15 | 10-15 | about 12 |
| Pour Point (ASTM D97), ° C. | −50 to −20 | −45 to −25 | −40 to −30 | −35 to −30 | about −33 |
| Flash Point (ASTM D92)), ° C. | 200-300 | 200-270 | 220-250 | 230-240 | about 236 |

Examples of alkylated napthalyenes within the meaning of Alkylated Naphthalene 1 and Alkylated Naphthalene 6 include those sold by King Industries under the trade designations NA-LUBE KR-007A; KR-008, KR-009; KR-015; KR-019; KR-005FG; KR-015FG; and KR-029FG.

Examples of alkylated napthalyenes within the meaning of Alkylated Naphthalene 2 and Alkylated Naphthalene 7 include those sold by King Industries under the trade designations NA-LUBE KR-007A; KR-008, KR-009; and KR-005FG.

An example of an alkylated napthylene that is within the meaning of Alkylated Naphthalene 5 and Alkylated Naphthalene 10 includes the product sold by King Industries under the trade designation NA-LUBE KR-008.

The alkylated naphthalene is preferably in the heat transfer compositions of the present invention that include a refrigerant of the present invention, including each of Refrigerants 1-25, wherein the alkylated naphthalene is present in an amount of from 0.01% to about 10%, or from about 1.5% to about 4.5%, or from about 2.5% to about 3.5%, where amounts are in percent by weight based on the amount of alkylated naphthalene plus refrigerant in the system.

The alkylated naphthalene is preferably in the heat transfer compositions of the present invention that include a lubricant and a refrigerant of the present invention, including each of Refrigerants 1-25, wherein the alkylated naphthalene is present in an amount of from 0.1% to about 20%, or from about 5% to about a 15%, or from about 8% to about 12%, where amounts are in percent by weight based on the amount of alkylated naphthalene plus lubricant in the system.

The alkylated naphthalene is preferably in the heat transfer compositions of the present invention that include a POE lubricant and a refrigerant of the present invention, including each of Refrigerants 1-25, wherein the alkylated naphthalene is present in an amount of from 0.1% to about 20%, or from about 5% to about a 15%, or from about 8% to about 12%, where amounts are in percent by weight based on the amount of alkylated naphthalene plus lubricant in the system.

The alkylated naphthalene is preferably in the heat transfer compositions of the present invention that include a POE lubricant having a viscosity at 40° C. measured according to ASTM D445C of from about 30 cSt to about 70 cSt and a refrigerant of the present invention, including each of Refrigerants 1-25, wherein the alkylated naphthalene is present in an amount of from 0.1% to about 20%, or from about 5% to about a 15%, or from about 8% to about 12%, where amounts are in percent by weight based on the amount of alkylated naphthalene plus lubricant in the system.

Diene-Based Compounds

The diene-based compounds include C3 to C15 dienes and to compounds formed by reaction of any two or more C3 to C4 dienes. Preferably, the diene based compounds are selected from the group consisting of allyl ethers, propadiene, butadiene, isoprene, and terpenes. The diene-based compounds are preferably terpenes, which include but are not limited to terebene, retinal, geraniol, terpinene, delta-3 carene, terpinolene, phellandrene, fenchene, myrcene, farnesene, pinene, nerol, citral, camphor, menthol, limonene, nerolidol, phytol, carnosic acid, and vitamin A1. Preferably, the stabilizer is farnesene. Preferred terpene stabilizers are disclosed in U.S. Provisional Patent Application No. 60/638,003 filed on Dec. 12, 2004, published as US 2006/0167044A1, which is incorporated herein by reference.

In addition, the diene based compounds can be provided in the heat transfer composition in an amount greater than 0 and preferably from 0.0001% by weight to about 5% by weight, preferably 0.001% by weight to about 2.5% by weight, and more preferably from 0.01% to about 1% by weight. In each case, percentage by weight refers to the weight of the heat transfer composition.

Phenol-Based Compounds

The phenol-based compound can be one or more compounds selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, and preferably BHT.

The phenol compounds can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, percentage by weight refers to the weight of the heat transfer composition.

The Phosphorus-Based Compounds

The phosphorus compound can be a phosphite or a phosphate compound. For the purposes of this invention, the phosphite compound can be a diaryl, dialkyl, triaryl and/or trialkyl phosphite, and/or a mixed aryl/alkyl di- or tri-substituted phosphite, in particular one or more compounds selected from hindered phosphites, tris-(di-tert-butylphenyl) phosphite, di-n-octyl phophite, iso-octyl diphenyl phosphite, iso-decyl diphenyl phosphite, tri-iso-decyl phosphate, triphenyl phosphite and diphenyl phosphite, particularly diphenyl phosphite. The phosphate compounds can be a triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

The phosphorus compounds can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, by weight refers to weight of the heat transfer composition.

The Nitrogen Compound

When the stabilizer is a nitrogen compound, the stabilizer may comprise an amine based compound such as one or more secondary or tertiary amines selected from diphenylamine, p-phenylenediamine, triethylamine, tributylamine, diisopropylamine, triisopropylamine and triisobutylamine. The amine based compound can be an amine antioxidant such as a substituted piperidine compound, i.e. a derivative of an alkyl substituted piperidyl, piperidinyl, piperazinone, or alkyoxypiperidinyl, particularly one or more amine antioxidants selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc). For the purposes of this invention, the amine based compound also can be an alkyldiphenyl amine such as bis (nonylphenyl amine), dialkylamine such as (N-(1-methylethyl)-2-propylamine, or. one or more of phenyl-alpha-naphthyl amine (PANA), alkyl-phenyl-alpha-naphthyl-amine (APANA), and bis (nonylphenyl) amine. Preferably the amine based compound is one or more of phenyl-alpha-naphthyl amine (PANA), alkyl-phenyl-alpha-naphthyl-amine (APANA) and bis (nonylphenyl) amine, amd more preferably phenyl-alpha-naphthyl amine (PANA).

Alternatively, or in addition to the nitrogen compounds identified above, one or more compounds selected from dinitrobenzene, nitrobenzene, nitromethane, nitrosobenzene, and TEMPO [(2,2,6,6-tetramethylpiperidin-1-yl)oxyl] may be used as the stabilizer.

The nitrogen compounds can be provided in the heat transfer composition in an amount of greater than 0 and from 0.0001% by weight to about 5% by weight, preferably 0.001% by weight to about 2.5% by weight, and more preferably from 0.01% to about 1% by weight. In each case, percentage by weight refers to the weight of the heat transfer composition.

Epoxides and Others

Useful epoxides include aromatic epoxides, alkyl epoxides, and alkyenyl epoxides.

Isobutylene may also be used as a stabilizer according to the present invention.

Preferably, the heat transfer composition comprises a refrigerant of the present invention, including each of Refrigerants 1-25, and a stabilizer composition comprising an alkylated naphthalene selected from Alkylated Napthalenes 1-5. For the purposes of the uses, methods and systems described herein, the stabilizer composition can comprise Alkylated Naphthalene 5 and BHT. Preferably, the stabilizer composition consists essentially of Alkylated Naphthalene 5 and BHT. Preferably, the stabilizer composition consists of Alkylated Naphthalene 5 and BHT.

Preferably, the heat transfer composition comprises a refrigerant of the present invention, including each of Refrigerants 1-25, and a stabilizer composition comprising an alkylated naphthalene selected from Alkylated Napthalenes 1-5. For the purposes of the uses, methods and systems described herein, the stabilizer composition can comprise Alkylated Naphthalene 5, BHT and epoxide. Preferably, the stabilizer composition consists essentially of Alkylated Naphthalene 5, BHT and epoxide. Preferably, the stabilizer composition consists of Alkylated Naphthalene 5, BHT and epoxide.

Preferably, the heat transfer composition comprises a refrigerant of the present invention, including each of Refrigerants 1-25, and a stabilizer composition comprising isobutylene and a alkylated naphthalene selected from Alkylated Napthalenes 1-5. For the purposes of the uses, methods and systems described herein, the stabilizer composition can comprise isobutylene, Alkylated Naphthalene 5, and BHT. Preferably, the stabilizer composition consists essentially of isobutylene, Alkylated Naphthalene 5, and BHT. Preferably, the stabilizer composition consists of isobutylene, Alkylated Naphthalene 5 and BHT.

The heat transfer composition includes a refrigerant of the present invention, including each of Refrigerants 1-25, and a stabilizer composition comprising Alkylated Naphthalene 4.

The heat transfer composition includes a refrigerant of the present invention, including each of Refrigerants 1-25, and a stabilizer composition comprising Alkylated Naphthalene 5.

The stabilizer can comprise, consist essentially of, or consist of farnesene and Alkylated Naphthalene 5.

The stabilizer can comprise, consist essentially of, or consist of isobutylene and Alkylated Naphthalene 5.

The heat transfer composition of the invention can preferably comprise any one and each of Refrigerant 1-25 and any one and each of Stabilizer 1-Stabilizer 8.

Heat transfer compositions can comprise the following combinations of any one of Refrigerants 1 to 25 and Stabilizer 1 and are identified for convenience herein as the indicated Heat Transfer Composition:

| REFRIGERANT | STABILIZER | HEAT TRANSFER COMPOSITION |
|---|---|---|
| Refrigerant 1 | Stabilizer 1 | 1 |
| Refrigerant 2 | Stabilizer 1 | 2 |
| Refrigerant 3 | Stabilizer 1 | 3 |
| Refrigerant 4 | Stabilizer 1 | 4 |
| Refrigerant 5 | Stabilizer 1 | 5 |
| Refrigerant 6 | Stabilizer 1 | 6 |
| Refrigerant 7 | Stabilizer 1 | 7 |
| Refrigerant 8 | Stabilizer 1 | 8 |
| Refrigerant 9 | Stabilizer 1 | 9 |
| Refrigerant 10 | Stabilizer 1 | 10 |
| Refrigerant 11 | Stabilizer 1 | 11 |
| Refrigerant 12 | Stabilizer 1 | 12 |
| Refrigerant 13 | Stabilizer 1 | 13 |
| Refrigerant 14 | Stabilizer 1 | 14 |
| Refrigerant 15 | Stabilizer 1 | 15 |
| Refrigerant 16 | Stabilizer 1 | 16 |
| Refrigerant 17 | Stabilizer 1 | 17 |
| Refrigerant 18 | Stabilizer 1 | 18 |
| Refrigerant 19 | Stabilizer 1 | 19 |
| Refrigerant 20 | Stabilizer 1 | 20 |
| Refrigerant 21 | Stabilizer 1 | 21 |
| Refrigerant 22 | Stabilizer 1 | 22 |
| Refrigerant 23 | Stabilizer 1 | 23 |
| Refrigerant 24 | Stabilizer 1 | 24 |
| Refrigerant 25 | Stabilizer 1 | 25 |

Heat transfer compositions can comprise the following combinations of any one of Refrigerants 1 to 25 and Stabilizer 6 and are identified for convenience herein as the indicated Heat Transfer Composition:

| REFRIGERANT | STABILIZER | HEAT TRANSFER COMPOSITION |
|---|---|---|
| Refrigerant 1 | Stabilizer 6 | 26 |
| Refrigerant 2 | Stabilizer 6 | 27 |
| Refrigerant 3 | Stabilizer 6 | 28 |
| Refrigerant 4 | Stabilizer 6 | 29 |
| Refrigerant 5 | Stabilizer 6 | 30 |
| Refrigerant 6 | Stabilizer 6 | 31 |
| Refrigerant 7 | Stabilizer 6 | 32 |
| Refrigerant 8 | Stabilizer 6 | 33 |
| Refrigerant 9 | Stabilizer 6 | 34 |
| Refrigerant 10 | Stabilizer 6 | 35 |
| Refrigerant 11 | Stabilizer 6 | 36 |
| Refrigerant 12 | Stabilizer 6 | 37 |
| Refrigerant 13 | Stabilizer 6 | 38 |
| Refrigerant 14 | Stabilizer 6 | 39 |
| Refrigerant 15 | Stabilizer 6 | 40 |
| Refrigerant 16 | Stabilizer 6 | 41 |

-continued

| REFRIGERANT | STABILIZER | HEAT TRANSFER COMPOSITION |
|---|---|---|
| Refrigerant 17 | Stabilizer 6 | 42 |
| Refrigerant 18 | Stabilizer 6 | 43 |
| Refrigerant 19 | Stabilizer 6 | 44 |
| Refrigerant 20 | Stabilizer 6 | 45 |
| Refrigerant 21 | Stabilizer 6 | 46 |
| Refrigerant 22 | Stabilizer 6 | 47 |
| Refrigerant 23 | Stabilizer 6 | 48 |
| Refrigerant 24 | Stabilizer 6 | 49 |
| Refrigerant 25 | Stabilizer 6 | 50 |

Lubricants:

Each of the heat transfer compositions of the invention as described herein, including those heat transfer compositions that include each of Refrigerants 1-25 and each of Heat Transfer Compositions 1-50, may additionally comprise a lubricant. In general, the heat transfer composition comprises a lubricant, in amounts of from about 5 to 60% by weight of the heat transfer composition, preferably about 10 to about 60% by weight of the heat transfer composition, preferably from about 20 to about 50% by weight of the heat transfer composition, alternatively about 20 to about 40% by weight of the heat transfer composition, alternatively about 20 to about 30% by weight of the heat transfer composition, alternatively about 30 to about 50% by weight of the heat transfer composition, alternatively about 30 to about 40% by weight of the heat transfer composition. The heat transfer composition may comprise a lubricant, in amounts of from about 5 to about 10% by weight of the heat transfer composition, preferably around about 8% by weight of the heat transfer composition.

Commonly used refrigerant lubricants such as polyol esters (POEs), polyalkylene glycols (PAGs), silicone oils, mineral oil, alkylbenzenes (ABs), polyvinyl ethers (PVEs) and poly(alpha-olefin) (PAO) for example, those that are used in refrigeration machinery, may be used with the refrigerant compositions of the present invention.

Preferably the lubricants are selected from polyol esters (POEs), polyalkylene glycols (PAGs), mineral oil, alkylbenzenes (ABs) and polyvinyl ethers (PVE), more preferably from polyol esters (POEs), mineral oil, alkylbenzenes (ABs) and polyvinyl ethers (PVE), particularly from polyol esters (POEs), mineral oil and alkylbenzenes (ABs), most preferably from polyol esters (POEs).

In general, the heat transfer composition of the present invention, including each of Heat Transfer Compositions 1-50, preferably comprises a POE lubricant and/or a PVE lubricant wherein the lubricant is preferably present in amounts preferably of from about 0.1% by weight to about 5%, or from 0.1% by weight to about 1% by weight, or from 0.1% by weight to about 0.5% by weight, based on the weight of the heat transfer composition.

In general, the heat transfer composition of the present invention, including each of Heat Transfer Compositions 1-50, preferably comprises an AB lubricant and/or a mineral oil lubricant wherein the lubricant is preferably present in amounts preferably of from about 0.1% by weight to about 5%, or from 0.1% by weight to about 1% by weight, or from 0.1% by weight to about 0.5% by weight, based on the weight of the heat transfer composition.

The heat transfer composition preferably comprises any one of Refrigerants 1-25 and a polyol ester (POE) lubricant.

The heat transfer compositions of the present invention, including each of Heat Transfer Comp The heat transfer composition preferably comprises any one of Refrigerants 1-25 and a polyol ester (POE) lubricant.

The heat transfer compositions of the present invention, including each of Heat Transfer Comp The heat transfer composition preferably comprises any one of Refrigerants 1-25 and a PVE lubricant.

The heat transfer compositions of the present invention, including each of Heat Transfer Compositions 1-50, preferably comprises a POE lubricant.

The heat transfer compositions of the present invention, including each of Heat Transfer Compositions 1-50, preferably comprises a PVE lubricant.

Commercially available mineral oils include Witco LP 250 (registered trademark) from Witco, Suniso 3GS from Witco and Calumet R015 from Calumet. Commercially available alkylbenzene lubricants include Zerol 150 (registered trademark) and Zerol 300 (registered trademark) from Shrieve Chemical. Commercially available esters include neopentyl glycol dipelargonate which is available as Emery 2917 (registered trademark) and Hatcol 2370 (registered trademark). Other useful esters include phosphate esters, di-basic acid esters and fluoro esters.

The heat transfer compositions of the invention, including each of Heat Transfer Compositions 1-50, may consist essentially of a refrigerant of the present invention and a lubricant as described herein.

The heat transfer composition of the invention may consist essentially of or consist of a refrigerant, a stabilizer composition and a lubricant as described herein.

Polyol ester (POE) lubricant present at from 0.5% to 50% by weight based on the weight of the heat transfer composition is referred to for convenience as Lubricant 1.

Polyol vinyl ether (PVE) lubricant present at from 0.5% to 50% by weight based on the weight of the heat transfer composition is referred to for convenience as Lubricant 2.

Heat transfer compositions can comprise the following combinations of any one of Refrigerants 1 to 25 and Lubricant 1 or Lubricant 2:

| REFRIGERANT | LUBRICANT |
|---|---|
| Refrigerant 1 | Lubricant 1 or Lubricant 2 |
| Refrigerant 2 | Lubricant 1 or Lubricant 2 |
| Refrigerant 3 | Lubricant 1 or Lubricant 2 |
| Refrigerant 4 | Lubricant 1 or Lubricant 2 |
| Refrigerant 5 | Lubricant 1 or Lubricant 2 |
| Refrigerant 6 | Lubricant 1 or Lubricant 2 |
| Refrigerant 7 | Lubricant 1 or Lubricant 2 |
| Refrigerant 8 | Lubricant 1 or Lubricant 2 |
| Refrigerant 9 | Lubricant 1 or Lubricant 2 |
| Refrigerant 10 | Lubricant 1 or Lubricant 2 |
| Refrigerant 11 | Lubricant 1 or Lubricant 2 |
| Refrigerant 12 | Lubricant 1 or Lubricant 2 |
| Refrigerant 13 | Lubricant 1 or Lubricant 2 |
| Refrigerant 14 | Lubricant 1 or Lubricant 2 |
| Refrigerant 15 | Lubricant 1 or Lubricant 2 |

-continued

| REFRIGERANT | LUBRICANT |
|---|---|
| Refrigerant 16 | Lubricant 1 or Lubricant 2 |
| Refrigerant 17 | Lubricant 1 or Lubricant 2 |
| Refrigerant 18 | Lubricant 1 or Lubricant 2 |
| Refrigerant 19 | Lubricant 1 or Lubricant 2 |
| Refrigerant 20 | Lubricant 1 or Lubricant 2 |
| Refrigerant 21 | Lubricant 1 or Lubricant 2 |
| Refrigerant 22 | Lubricant 1 or Lubricant 2 |
| Refrigerant 23 | Lubricant 1 or Lubricant 2 |
| Refrigerant 24 | Lubricant 1 or Lubricant 2 |
| Refrigerant 25 | Lubricant 1 or Lubricant 2 |

Heat transfer compositions can comprise the following combinations of any one of Refrigerants 1 to 25, Stabilizer 1, and Lubricant 1 or Lubricant 2:

| REFRIGERANT | STABILIZER | LUBRICANT |
|---|---|---|
| Refrigerant 1 | Stabilizer 1 | Lubricant 1 or Lubricant 2 |
| Refrigerant 2 | Stabilizer 1 | Lubricant 1 or Lubricant 2 |
| Refrigerant 3 | Stabilizer 1 | Lubricant 1 or Lubricant 2 |
| Refrigerant 4 | Stabilizer 1 | Lubricant 1 or Lubricant 2 |
| Refrigerant 5 | Stabilizer 1 | Lubricant 1 or Lubricant 2 |
| Refrigerant 6 | Stabilizer 1 | Lubricant 1 or Lubricant 2 |
| Refrigerant 7 | Stabilizer 1 | Lubricant 1 or Lubricant 2 |
| Refrigerant 8 | Stabilizer 1 | Lubricant 1 or Lubricant 2 |
| Refrigerant 9 | Stabilizer 1 | Lubricant 1 or Lubricant 2 |
| Refrigerant 10 | Stabilizer 1 | Lubricant 1 or Lubricant 2 |
| Refrigerant 11 | Stabilizer 1 | Lubricant 1 or Lubricant 2 |
| Refrigerant 12 | Stabilizer 1 | Lubricant 1 or Lubricant 2 |
| Refrigerant 13 | Stabilizer 1 | Lubricant 1 or Lubricant 2 |
| Refrigerant 14 | Stabilizer 1 | Lubricant 1 or Lubricant 2 |
| Refrigerant 15 | Stabilizer 1 | Lubricant 1 or Lubricant 2 |
| Refrigerant 16 | Stabilizer 1 | Lubricant 1 or Lubricant 2 |
| Refrigerant 17 | Stabilizer 1 | Lubricant 1 or Lubricant 2 |
| Refrigerant 18 | Stabilizer 1 | Lubricant 1 or Lubricant 2 |
| Refrigerant 19 | Stabilizer 1 | Lubricant 1 or Lubricant 2 |
| Refrigerant 20 | Stabilizer 1 | Lubricant 1 or Lubricant 2 |
| Refrigerant 21 | Stabilizer 1 | Lubricant 1 or Lubricant 2 |
| Refrigerant 22 | Stabilizer 1 | Lubricant 1 or Lubricant 2 |
| Refrigerant 23 | Stabilizer 1 | Lubricant 1 or Lubricant 2 |
| Refrigerant 24 | Stabilizer 1 | Lubricant 1 or Lubricant 2 |

-continued

| REFRIGERANT | STABILIZER | LUBRICANT |
|---|---|---|
| Refrigerant 25 | Stabilizer 1 | Lubricant 1 or Lubricant 2 |

Heat transfer compositions can comprise the following combinations of any one of Refrigerants 1 to 25, Stabilizer 6, and Lubricant 1 or Lubricant 2:

| REFRIGERANT | STABILIZER | LUBRICANT |
|---|---|---|
| Refrigerant 1 | Stabilizer 6 | Lubricant 1 or Lubricant 2 |
| Refrigerant 2 | Stabilizer 6 | Lubricant 1 or Lubricant 2 |
| Refrigerant 3 | Stabilizer 6 | Lubricant 1 or Lubricant 2 |
| Refrigerant 4 | Stabilizer 6 | Lubricant 1 or Lubricant 2 |
| Refrigerant 5 | Stabilizer 6 | Lubricant 1 or Lubricant 2 |
| Refrigerant 6 | Stabilizer 6 | Lubricant 1 or Lubricant 2 |
| Refrigerant 7 | Stabilizer 6 | Lubricant 1 or Lubricant 2 |
| Refrigerant 8 | Stabilizer 6 | Lubricant 1 or Lubricant 2 |
| Refrigerant 9 | Stabilizer 6 | Lubricant 1 or Lubricant 2 |
| Refrigerant 10 | Stabilizer 6 | Lubricant 1 or Lubricant 2 |
| Refrigerant 11 | Stabilizer 6 | Lubricant 1 or Lubricant 2 |
| Refrigerant 12 | Stabilizer 6 | Lubricant 1 or Lubricant 2 |
| Refrigerant 13 | Stabilizer 6 | Lubricant 1 or Lubricant 2 |
| Refrigerant 14 | Stabilizer 6 | Lubricant 1 or Lubricant 2 |
| Refrigerant 15 | Stabilizer 6 | Lubricant 1 or Lubricant 2 |
| Refrigerant 16 | Stabilizer 6 | Lubricant 1 or Lubricant 2 |
| Refrigerant 17 | Stabilizer 6 | Lubricant 1 or Lubricant 2 |
| Refrigerant 18 | Stabilizer 6 | Lubricant 1 or Lubricant 2 |
| Refrigerant 19 | Stabilizer 6 | Lubricant 1 or Lubricant 2 |
| Refrigerant 20 | Stabilizer 6 | Lubricant 1 or Lubricant 2 |
| Refrigerant 21 | Stabilizer 6 | Lubricant 1 or Lubricant 2 |
| Refrigerant 22 | Stabilizer 6 | Lubricant 1 or Lubricant 2 |
| Refrigerant 23 | Stabilizer 6 | Lubricant 1 or Lubricant 2 |
| Refrigerant 24 | Stabilizer 6 | Lubricant 1 or Lubricant 2 |
| Refrigerant 25 | Stabilizer 6 | Lubricant 1 or Lubricant 2 |

Other additives not mentioned herein can also be included by those skilled in the art in view of the teaching contained herein without departing from the novel and basic features of the present invention.

Combinations of surfactants and solubilizing agents may also be added to the present compositions to aid oil solubility as disclosed in U.S. Pat. No. 6,516,837, the disclosure of which is incorporated by reference in its entirety.

Any reference to the heat transfer composition of the invention refers to each and any of the heat transfer compositions as described herein. Thus, for the following discussion of the uses or applications of the composition of the invention, the heat transfer composition may comprise or consist essentially of any refrigerant of the present invention, including any of Refrigerants 1-25 described herein.

Methods, Uses and Systems

The refrigerants according to the present invention and heat transfer compositions disclosed herein are provided for use in heat transfer applications, including air conditioning (including particularly residential air conditioners), refrigeration, heat pumps and chillers (including portable water chillers and central water chillers).

The heat transfer compositions disclosed herein are provided for use in heat transfer applications, including air conditioning applications, with highly preferred air conditioning applications including residential air conditioning, commercial air conditioning applications (such as roof top applications, VRF applications and chillers.

The present invention also includes methods for providing heat transfer including methods of air conditioning, with highly preferred air conditioning methods including providing residential air conditioning, providing commercial air conditioning (such as methods of providing roof top air conditioning, methods of providing VRF air conditioning and methods of providing air conditioning using chillers.

The present invention also includes heat transfer systems, including air conditioning systems, with highly preferred air conditioning systems including residential air conditioning, commercial air conditioning systems (such as roof top air conditioning systems, VRF air conditioning systems and air conditioning chiller systems).

The invention also provides uses of the heat transfer compositions, methods using the heat transfer compositions and systems containing the heat transfer compostions in connection with refrigeration, heat pumps and chillers (including portable water chillers and central water chillers).

Any reference to the heat transfer composition of the invention refers to each and any of the heat transfer compositions as described herein. Thus, for the following discussion of the uses, methods, systems or applications of the composition of the invention, the heat transfer composition may comprise or consist essentially of any the heat transfer compositions that comprise any of Refrigerants 1-25 and any of of Heat Transfer Compositions 1-50.

For the purposes of this invention, each and any of the heat transfer compositions as described herein can be used in a heat transfer system, such as an air conditioning system (including particularly residential air conditioning systems), a refrigeration system, a heat pump and a chiller system (including a portable water chiller and a central water chiller). The heat transfer system according to the present invention can comprise a compressor, an evaporator, a condenser and an expansion device, in communication with each other.

Examples of commonly used compressors, for the purposes of this invention include reciprocating, rotary (including rolling piston and rotary vane), scroll, screw, and centrifugal compressors. Thus, the present invention provides each and any of Refrigerants 1-25 and/or heat transfer compositions as described herein for use in a heat transfer system comprising a reciprocating, rotary (including rolling piston and rotary vane), scroll, screw, or centrifugal compressor.

Examples of commonly used expansion devices, for the purposes of this invention include a capillary tube, a fixed orifice, a thermal expansion valve and an electronic expansion valve. Thus, the present invention provides each and any of Refrigerants 1-25 and/or heat transfer compositions as described herein for use in a heat transfer system comprising a capillary tube, a fixed orifice, a thermal expansion valve or an electronic expansion valve.

For the purposes of this invention, the evaporator and the condenser together form a heat exchanger, preferably selected from a finned tube heat exchanger, a microchannel heat exchanger, a shell and tube, a plate heat exchanger, and a tube-in-tube heat exchanger. Thus, the present invention provides each and any of Refrigerants 1-25 and/or heat transfer compositions as described herein for use in a heat transfer system wherein the evaporator and condenser together form a finned tube heat exchanger, a microchannel heat exchanger, a shell and tube, a plate heat exchanger, or a tube-in-tube heat exchanger.

For heat transfer systems of the present invention that include a compressor and lubricant for the compressor in the system, the system can comprises a loading of refrigerant and lubricant such that the lubricant loading in the system is from about 5% to 60% by weight, or from about 10% to about 60% by weight, or from about 20% to about 50% by weight, or from about 20% to about 40% by weight, or from about 20% to about 30% by weight, or from about 30% to about 50% by weight, or from about 30% to about 40% by weight. As used herein, the term "lubricant loading" refers to the total weight of lubricant contained in the system as a percentage of total of lubricant and refrigerant contained in the system. Such systems may also include a lubricant loading of from about 5% to about 10% by weight, or about 8% by weight of the heat transfer composition.

The heat transfer systems according to the present invention can comprise a compressor, an evaporator, a condenser and an expansion device, in fluid communication with each other, a Heat Transfer Compositions 1-50 and a sequestration material in the system, wherein said sequestration material preferably comprises:

i. copper or a copper alloy, or
ii. activated alumina, or
iii. a zeolite molecular sieve comprising copper, silver, lead or a combination thereof, or
iv. an anion exchange resin, or
v. a moisture-removing material, preferably a moisture-removing molecular sieve, or
vi. a combination of two or more of the above.

The present invention also includes methods for transferring heat of the type comprising evaporating refrigerant liquid to produce a refrigerant vapor, compressing in a compressor at least a portion of the refrigerant vapor and condensing refrigerant vapor in a plurality of repeating cycles, said method comprising:

(a) providing a heat transfer composition according to the present invention, including each of Heat Transfer Compositions 1-50;
(b) optionally but preferably providing lubricant for said compressor; and
(b) exposing at least a portion of said refrigerant and/or at least a portion of said lubricant to a sequestration material.

Uses, Equipment and Systems

In preferred embodiments, residential air conditioning systems and methods have refrigerant evaporating temperatures in the range of from about 0° C. to about 10° C. and the condensing temperature is in the range of about 40° C. to about 70° C.

In preferred embodiments, residential air conditioning systems and methods used in a heating mode have refrigerant evaporating temperatures in the range of from about −20° C. to about 3° C. and the condensing temperature is in the range of about 35° C. to about 50° C.

In preferred embodiments, commercial air conditioning systems and methods have refrigerant evaporating temperatures in the range of from about 0° C. to about 10° C. and the condensing temperature is in the range of about 40° C. to about 70° C.

In preferred embodiments, hydronic system systems and methods have refrigerant evaporating temperatures in the range of from about −20° C. to about 3° C. and the condensing temperature is in the range of about 50° C. to about 90° C.

In preferred embodiments, medium temperature systems and methods have refrigerant evaporating temperatures in the range of from about −12° C. to about 0° C. and the condensing temperature is in the range of about 40° C. to about 70° C.

In preferred embodiments, low temperature systems and methods have refrigerant evaporating temperatures in the range of from about −40° C. to about −12° C. and the condensing temperature is in the range of about 40° C. to about 70° C.

In preferred embodiments, rooftop air conditioning systems and methods have refrigerant evaporating temperatures in the range of from about 0° C. to about 10° C. and the condensing temperature is in the range of about 40° C. to about 70° C.

In preferred embodiments, VRF systems and methods have refrigerant evaporating temperatures in the range of from about 0° C. to about 10° C. and the condensing temperature is in the range of about 40° C. to about 70° C.

The present invention includes any of the heat transfer compositions of the invention, including Heat Transfer Compostions 1-50, in a chiller or in residential air conditioning as indicated in the following table:

| Heat Transfer Comp | SYSTEM |
|---|---|
| Heat Transfer Composition 1 | Chiller or residential air conditioning |
| Heat Transfer Composition 2 | Chiller or residential air conditioning |
| Heat Transfer Composition 3 | Chiller or residential air conditioning |
| Heat Transfer Composition 4 | Chiller or residential air conditioning |
| Heat Transfer Composition 5 | Chiller or residential air conditioning |
| Heat Transfer Composition 6 | Chiller or residential air conditioning |
| Heat Transfer Composition 7 | Chiller or residential air conditioning |
| Heat Transfer Composition 8 | Chiller or residential air conditioning |
| Heat Transfer Composition 9 | Chiller or residential air conditioning |
| Heat Transfer Composition 10 | Chiller or residential air conditioning |
| Heat Transfer Composition 11 | Chiller or residential air conditioning |
| Heat Transfer Composition 12 | Chiller or residential air conditioning |
| Heat Transfer Composition 13 | Chiller or residential air conditioning |
| Heat Transfer Composition 14 | Chiller or residential air conditioning |
| Heat Transfer Composition 15 | Chiller or residential air conditioning |
| Heat Transfer Composition 16 | Chiller or residential air conditioning |
| Heat Transfer Composition 17 | Chiller or residential air conditioning |
| Heat Transfer Composition 18 | Chiller or residential air conditioning |
| Heat Transfer Composition 19 | Chiller or residential air conditioning |
| Heat Transfer Composition 20 | Chiller or residential air conditioning |
| Heat Transfer Composition 21 | Chiller or residential air conditioning |
| Heat Transfer Composition 22 | Chiller or residential air conditioning |
| Heat Transfer Composition 23 | Chiller or residential air conditioning |
| Heat Transfer Composition 24 | Chiller or residential air conditioning |
| Heat Transfer Composition 25 | Chiller or residential air conditioning |
| Heat Transfer Composition 26 | Chiller or residential air conditioning |
| Heat Transfer Composition 27 | Chiller or residential air conditioning |
| Heat Transfer Composition 28 | Chiller or residential air conditioning |
| Heat Transfer Composition 29 | Chiller or residential air conditioning |
| Heat Transfer Composition 30 | Chiller or residential air conditioning |
| Heat Transfer Composition 31 | Chiller or residential air conditioning |
| Heat Transfer Composition 32 | Chiller or residential air conditioning |
| Heat Transfer Composition 33 | Chiller or residential air conditioning |
| Heat Transfer Composition 34 | Chiller or residential air conditioning |
| Heat Transfer Composition 35 | Chiller or residential air conditioning |
| Heat Transfer Composition 36 | Chiller or residential air conditioning |
| Heat Transfer Composition 37 | Chiller or residential air conditioning |
| Heat Transfer Composition 38 | Chiller or residential air conditioning |
| Heat Transfer Composition 39 | Chiller or residential air conditioning |
| Heat Transfer Composition 40 | Chiller or residential air conditioning |
| Heat Transfer Composition 41 | Chiller or residential air conditioning |
| Heat Transfer Composition 42 | Chiller or residential air conditioning |
| Heat Transfer Composition 43 | Chiller or residential air conditioning |
| Heat Transfer Composition 44 | Chiller or residential air conditioning |
| Heat Transfer Composition 45 | Chiller or residential air conditioning |
| Heat Transfer Composition 46 | Chiller or residential air conditioning |
| Heat Transfer Composition 47 | Chiller or residential air conditioning |
| Heat Transfer Composition 48 | Chiller or residential air conditioning |
| Heat Transfer Composition 49 | Chiller or residential air conditioning |
| Heat Transfer Composition 50 | Chiller or residential air conditioning |

The systems of the present invention thus preferably include a sequestration material in contact with at least a portion of a refrigerant and/or at least a portion of a the lubricant according to the present invention wherein the temperature of said sequestration material and/or the temperature of said refrigerant and/or the temperature of said lubricant when in said contact are at a temperature that is preferably at least about 10 C wherein the sequestration material preferably comprises a combination of:

an anion exchange resin, activated alumina, a zeolite molecular sieve comprising silver, and a moisture-removing material, preferably a moisture-removing molecular sieve.

As used in this application, the term "in contact with at least a portion" is intended in its broad sense to include each of said sequestration materials and any combination of sequestration materials being in contact with the same or separate portions of the refrigerant and/or the lubricant in the system and is intended to include but not necessarily limited to embodiments in which each type or specific sequestration material is: (i) located physically together with each other type or specific material, if present; (ii) is located physically separate from each other type or specific material, if present, and (iii) combinations in which two or more materials are physically together and at least one sequestration material is physically separate from at least one other sequestration material.

The refrigerants and heat transfer composition of the invention can be used in heating and cooling applications. In general, all such systems and methods of cooling and/or heating are useful with and within the scope of the present invention, however several exemplary and preferred systems and associated methods, including such systems and methods which use a sequestration material in accordance with the present invention, are illustrated and described in co-pending U.S. application Ser. No. 16/135,962, which is incorporated herein by reference.

In a particular feature of the invention, the heat transfer composition can be used in a method of cooling comprising condensing the refrigerant of the present invention and subsequently evaporating the refrigerant in the vicinity of an article or body to be cooled.

Thus, the invention relates to a method of cooling in a heat transfer system comprising an evaporator, a condenser and a compressor, the process comprising i) condensing a refrigerant as described herein, including in particular any one of Refrigerants 1-25; and ii) evaporating the refrigerant in the vicinity of body or article to be cooled at a temperature of from about −40° C. to about +10° C.

Alternatively, or in addition, the heat transfer composition can be used in a method of heating comprising condensing the heat transfer composition in the vicinity of an article or body to be heated and subsequently evaporating said composition.

Thus, the invention relates to a method of heating in a heat transfer system comprising an evaporator, a condenser and a compressor, the process comprising i) condensing a refrigerant as described herein, including in particular any one of Refrigerants 1-25, in the vicinity of a body or article to be heated and ii) evaporating the refrigerant at a temperature of from about −30° C. to about 5° C.

The refrigerants according to the present invention, including in particular any of Refrigerants 1-25 and heat transfer composition of the present invention are provided for use in air conditioning applications including both mobile and stationary air conditioning applications. As used here, the term mobile air conditioning systems means mobile, non-passenger car air conditioning systems, such as air conditioning systems in trucks, buses, and trains. Thus, any of the refrigerants according to the present invention, including in particular any of Refrigerants 1-25 and any of the heat transfer compositions described herein can be used in any one of:

an air conditioning application including mobile air conditioning, particularly air conditioning systems in buses and trains;

a mobile heat pump, particularly an electric vehicle heat pump;

a chiller, particularly a positive displacement chiller, more particularly an air cooled or water cooled direct expansion chiller, which is either modular or conventionally singularly packaged;

a residential air conditioning system, particularly a ducted split or a ductless split air conditioning system;

a residential heat pump;

a residential air to water heat pump/hydronic system;

an industrial air conditioning system;

a commercial air conditioning system, particularly a packaged rooftop unit and a variable refrigerant flow (VRF) system;

a commercial air source, water source or ground source heat pump system.

The refrigerants according to the present invention, including in particular any of Refrigerants 1-25 and the heat transfer compositions of the invention are provided for use in a refrigeration system. The term "Refrigeration Systems" refers to any system or apparatus or any part or portion of such a system or apparatus which employs a refrigerant to provide cooling. Thus, any refrigerants according to the present invention, including in particular any of Refrigerants 1-25 and any of the heat transfer compositions described herein can be used in any one of the Refrigeration Systems:

a low temperature refrigeration system, a medium temperature refrigeration system, a commercial refrigerator, a commercial freezer, an ice machine, a vending machine, a transport refrigeration system, a domestic freezer, a domestic refrigerator, an industrial freezer, an industrial refrigerator and a chiller.

Each of the heat transfer compositions described herein, including heat transfer compositions containing any one of Refrigerants 1-25, is particularly provided for use in a residential air-conditioning system (with an evaporator temperature in the range of about 0 to about 10° C., particularly about 7° C. for cooling and/or in the range of about −20 to about 3° C., particularly about 0.5° C. for heating). Alternatively, or additionally, each of the heat transfer compositions described herein, including each heat transfer composition that includes any on of Refrigerants 1-25 and each of Heat Transfer Compositions 1-50 is particularly provided for use in a residential air conditioning system with a reciprocating, rotary (rolling-piston or rotary vane) or scroll compressor.

Each of the heat transfer compositions described including each heat transfer composition that includes any on of Refrigerants 1-25 and each of Heat Transfer Compositions 1-50, is particularly provided for use in an air cooled chiller (with an evaporator temperature in the range of about 0 to about 10° C., particularly about 4.5° C.), particularly an air cooled chiller with a positive displacement compressor, more particular an air cooled chiller with a reciprocating scroll compressor.

Each of the heat transfer compositions described herein, including each heat transfer composition that includes any on of Refrigerants 1-25 and each of Heat Transfer Compositions 1-50, is particularly provided for use in a residential air to water heat pump hydronic system (with an evaporator temperature in the range of about −20° C. to about 3° C., particularly about 0.5° C. or with an evaporator temperature in the range of about −30° C. to about 5° C., particularly about 0.5° C.).

Each of the heat transfer compositions including each heat transfer composition that includes any on of Refrigerants 1-25 and each of Heat Transfer Compositions 1-50, is particularly provided for use in a medium temperature refrigeration system (with an evaporator temperature in the range of about −12 to about 0° C., particularly about −8° C.).

Each of the heat transfer compositions including each heat transfer composition that includes any on of Refrigerants 1-25 and each of Heat Transfer Compositions 1-50, is particularly provided for use in a low temperature refrigeration system (with an evaporator temperature in the range of about −40° C. to about −12° C., particularly about from about −40° C. to about −23° C. or preferably about −32° C.).

The heat transfer composition of the invention, including each heat transfer composition that includes any on of Refrigerants 1-25 and each of Heat Transfer Compositions 1-50 is provided for use in a residential air conditioning system, wherein the residential air-conditioning system is used to supply cool air (said air having a temperature of for example, about 10° C. to about 17° C., particularly about 12° C.) to buildings for example, in the summer. Typical system types are split, mini-split, and window, ducted split, ductless split, window, and portable air-conditioning system. The system usually has an air-to-refrigerant evaporator (indoor coil), a compressor, an air-to-refrigerant condenser (outdoor coil), and an expansion valve. The evaporator and condenser are usually a round tube plate fin, a finned tube or micro-channel heat exchanger. The compressor is usually a reciprocating or rotary (rolling-piston or rotary vane) or scroll compressor. The expansion valve is usually a capillary tube, thermal or electronic expansion valve. The refrigerant evaporating temperature is preferably in the range of 0° C. to 10° C. The condensing temperature is preferably in the range of 40° C. to 70° C.

The heat transfer composition of the invention, including heat transfer compositions containing any one of Refrigerants 1-25, is provided for use in a residential heat pump system, wherein the residential heat pump system is used to supply warm air (said air having a temperature of for example, about 18° C. to about 24° C., particularly about 21° C.) to buildings in the winter. It can be the same system as the residential air-conditioning system, while in the heat pump mode the refrigerant flow is reversed and the indoor coil becomes condenser and the outdoor coil becomes evaporator. Typical system types are split and mini-split heat pump system. The evaporator and condenser are usually a round tube plate fin, a finned or microchannel heat exchanger. The compressor is usually a reciprocating or rotary (rolling-piston or rotary vane) or scroll compressor. The expansion valve is usually a thermal or electronic expansion valve. The refrigerant evaporating temperature is preferably in the range of about −20° C. to about 3° C. or about −30° C. to about 5° C. The condensing temperature is preferably in the range of about 35° C. to about 50° C.

The heat transfer composition of the invention, including heat transfer compositions containing any one of Refrigerants 1-25, is provided for use in a commercial air-conditioning system wherein the commercial air conditioning system can be a chiller which is used to supply chilled water (said water having a temperature of for example about 7° C.) to large buildings such as offices and hospitals, etc. Depending on the application, the chiller system may be running all year long. The chiller system may be air-cooled or water-cooled. The air-cooled chiller usually has a plate, tube-in-tube or shell-and-tube evaporator to supply chilled water, a reciprocating or scroll compressor, a round tube plate fin, a finned tube or microchannel condenser to exchange heat with ambient air, and a thermal or electronic expansion valve. The water-cooled system usually has a shell-and-tube evaporator to supply chilled water, a reciprocating, scroll, screw or centrifugal compressor, a shell-and-tube condenser to exchange heat with water from cooling tower or lake, sea and other natural recourses, and a thermal or electronic expansion valve. The refrigerant evaporating temperature is preferably in the range of about 0° C. to about 10° C. The condensing temperature is preferably in the range of about 40° C. to about 70° C.

The heat transfer composition of the invention, including heat transfer compositions containing any one of Refrigerants 1-25, is provided for use in a residential air-to-water heat pump hydronic system, wherein the residential air-to-water heat pump hydronic system is used to supply hot water (said water having a temperature of for example about 50° C. or about 55° C.) to buildings for floor heating or similar applications in the winter. The hydronic system usually has a round tube plate fin, a finned tube or microchannel evaporator to exchange heat with ambient air, a reciprocating, scroll or rotary compressor, a plate, tube-in-tube or shell-in-tube condenser to heat the water, and a thermal or electronic expansion valve. The refrigerant evaporating temperature is preferably in the range of about −20° C. to about 3° C., or −30° C. to about 5° C. The condensing temperature is preferably in the range of about 50° C. to about 90° C.

The heat transfer composition of the invention, including heat transfer compositions containing any one of Refrigerants 1-25, is provided for use in a medium temperature refrigeration system, wherein the medium temperature refrigeration system is preferably used to chill food or beverages such as in a refrigerator or a bottle cooler. The system usually has an air-to-refrigerant evaporator to chill the food or beverage, a reciprocating, scroll or screw or rotary compressor, an air-to-refrigerant condenser to exchange heat with the ambient air, and a thermal or electronic expansion valve. The refrigerant evaporating temperature is preferably in the range of about −12° C. to about 0° C. The condensing temperature is preferably in the range of about 40° C. to about 70° C., or about 20° C. to about 70° C.

The heat transfer composition of the invention, including heat transfer compositions containing any one of Refrigerants 1-25, is provided for use in a low temperature refrigeration system, wherein said low temperature refrigeration system is preferably used in a freezer or an ice cream machine. The system usually has an air-to-refrigerant evaporator to chill the food or beverage, a reciprocating, scroll or rotary compressor, an air-to-refrigerant condenser to exchange heat with the ambient air, and a thermal or electronic expansion valve. The refrigerant evaporating temperature is preferably in the range of about −40° C. to about −12° C. The condensing temperature is preferably in the range of about 40° C. to about 70° C., or about 20° C. to about 70° C.

Heat transfer compositions comprise any one of Refrigerants 1 to 25 in a chiller or a commercial air conditioning system as follows:

| REFRIGERANT | SYSTEM |
|---|---|
| Refrigerant 1 | chiller or commercial air conditioning |
| Refrigerant 2 | chiller or commercial air conditioning |
| Refrigerant 3 | chiller or commercial air conditioning |
| Refrigerant 4 | chiller or commercial air conditioning |
| Refrigerant 5 | chiller or commercial air conditioning |
| Refrigerant 6 | chiller or commercial air conditioning |
| Refrigerant 7 | chiller or commercial air conditioning |
| Refrigerant 8 | chiller or commercial air conditioning |
| Refrigerant 9 | chiller or commercial air conditioning |
| Refrigerant 10 | chiller or commercial air conditioning |
| Refrigerant 11 | chiller or commercial air conditioning |
| Refrigerant 12 | chiller or commercial air conditioning |
| Refrigerant 13 | chiller or commercial air conditioning |
| Refrigerant 14 | chiller or commercial air conditioning |
| Refrigerant 15 | chiller or commercial air conditioning |
| Refrigerant 16 | chiller or commercial air conditioning |
| Refrigerant 17 | chiller or commercial air conditioning |
| Refrigerant 18 | chiller or commercial air conditioning |
| Refrigerant 19 | chiller or commercial air conditioning |
| Refrigerant 20 | chiller or commercial air conditioning |
| Refrigerant 21 | chiller or commercial air conditioning |
| Refrigerant 22 | chiller or commercial air conditioning |
| Refrigerant 23 | chiller or commercial air conditioning |
| Refrigerant 24 | chiller or commercial air conditioning |
| Refrigerant 25 | chiller or commercial air conditioning |

Heat transfer compositions comprise any one of Refrigerants 1 to 25 and Stabilizer 1 and POE lubricant in a chiller or a commercial air conditioning system as follows as follows:

| REFRIGERANT | STABILIZER | Lubricant | SYSTEM |
|---|---|---|---|
| Refrigerant 1 | Stabilizer 1 | POE | chiller or commercial air conditioning |
| Refrigerant 2 | Stabilizer 1 | POE | chiller or commercial air conditioning |
| Refrigerant 3 | Stabilizer 1 | POE | chiller or commercial air conditioning |
| Refrigerant 4 | Stabilizer 1 | POE | chiller or commercial air conditioning |
| Refrigerant 5 | Stabilizer 1 | POE | chiller or commercial air conditioning |
| Refrigerant 6 | Stabilizer 1 | POE | chiller or commercial air conditioning |
| Refrigerant 7 | Stabilizer 1 | POE | chiller or commercial air conditioning |
| Refrigerant 8 | Stabilizer 1 | POE | chiller or commercial air conditioning |
| Refrigerant 9 | Stabilizer 1 | POE | chiller or commercial air conditioning |
| Refrigerant 10 | Stabilizer 1 | POE | chiller or commercial air conditioning |
| Refrigerant 11 | Stabilizer 1 | POE | chiller or commercial air conditioning |
| Refrigerant 12 | Stabilizer 1 | POE | chiller or commercial air conditioning |
| Refrigerant 13 | Stabilizer 1 | POE | chiller or commercial air conditioning |
| Refrigerant 14 | Stabilizer 1 | POE | chiller or commercial air conditioning |
| Refrigerant 15 | Stabilizer 1 | POE | chiller or commercial air conditioning |
| Refrigerant 16 | Stabilizer 1 | POE | chiller or commercial air conditioning |
| Refrigerant 17 | Stabilizer 1 | POE | chiller or commercial air conditioning |
| Refrigerant 18 | Stabilizer 1 | POE | chiller or commercial air conditioning |
| Refrigerant 19 | Stabilizer 1 | POE | chiller or commercial air conditioning |
| Refrigerant 20 | Stabilizer 1 | POE | chiller or commercial air conditioning |
| Refrigerant 21 | Stabilizer 1 | POE | chiller or commercial air conditioning |
| Refrigerant 22 | Stabilizer 1 | POE | chiller or commercial air conditioning |
| Refrigerant 23 | Stabilizer 1 | POE | chiller or commercial air conditioning |
| Refrigerant 24 | Stabilizer 1 | POE | chiller or commercial air conditioning |
| Refrigerant 25 | Stabilizer 1 | POE | chiller or commercial air conditioning |

For the purposes of this invention, the heat transfer composition as set out above is provided for use in a chiller with an evaporating temperature in the range of about 000 to about 10° C. and a condensing temperature in the range of about 40° C. to about 70° C. The chiller is provided for use in air conditioning or refrigeration, preferably for refrigeration. The chiller is preferably a positive displacement chiller, more particularly an air cooled or water cooled direct expansion chiller, which is either modular or conventionally singularly packaged.

Heat transfer compositions comprise any one of Refrigerants 1 to 25 in an Air Conditioning System where residential air conditioning is hereinafter abbreviated as Residential AC.

Heat transfer compositions comprise any one of Refrigerants 1 to 25 in a residential air conditioning system or a heat pump as indicated in the following table:

| REFRIGERANT | SYSTEM |
|---|---|
| Refrigerant 1 | Residential AC or heat pump |
| Refrigerant 2 | Residential AC or heat pump |
| Refrigerant 3 | Residential AC or heat pump |
| Refrigerant 4 | Residential AC or heat pump |
| Refrigerant 5 | Residential AC or heat pump |
| Refrigerant 6 | Residential AC or heat pump |
| Refrigerant 7 | Residential AC or heat pump |
| Refrigerant 8 | Residential AC or heat pump |
| Refrigerant 9 | Residential AC or heat pump |
| Refrigerant 10 | Residential AC or heat pump |
| Refrigerant 11 | Residential AC or heat pump |
| Refrigerant 12 | Residential AC or heat pump |
| Refrigerant 13 | Residential AC or heat pump |
| Refrigerant 14 | Residential AC or heat pump |
| Refrigerant 15 | Residential AC or heat pump |
| Refrigerant 16 | Residential AC or heat pump |
| Refrigerant 17 | Residential AC or heat pump |
| Refrigerant 18 | Residential AC or heat pump |

-continued

| REFRIGERANT | SYSTEM |
|---|---|
| Refrigerant 19 | Residential AC or heat pump |
| Refrigerant 20 | Residential AC or heat pump |
| Refrigerant 21 | Residential AC or heat pump |
| Refrigerant 22 | Residential AC or heat pump |
| Refrigerant 23 | Residential AC or heat pump |
| Refrigerant 24 | Residential AC or heat pump |
| Refrigerant 25 | Residential AC or heat pump |

Heat transfer compositions comprise any one of Refrigerants 1 to 25 and Stabilizer 1 in Residential AC or in a heat pump as follows:

| REFRIGERANT | STABILIZER | SYSTEM |
|---|---|---|
| Refrigerant 1 | Stabilizer 1 | Residential AC or heat pump |
| Refrigerant 2 | Stabilizer 1 | Residential AC or heat pump |
| Refrigerant 3 | Stabilizer 1 | Residential AC or heat pump |
| Refrigerant 4 | Stabilizer 1 | Residential AC or heat pump |
| Refrigerant 5 | Stabilizer 1 | Residential AC or heat pump |
| Refrigerant 6 | Stabilizer 1 | Residential AC or heat pump |
| Refrigerant 7 | Stabilizer 1 | Residential AC or heat pump |
| Refrigerant 8 | Stabilizer 1 | Residential AC or heat pump |
| Refrigerant 9 | Stabilizer 1 | Residential AC or heat pump |
| Refrigerant 10 | Stabilizer 1 | Residential AC or heat pump |
| Refrigerant 11 | Stabilizer 1 | Residential AC or heat pump |
| Refrigerant 12 | Stabilizer 1 | Residential AC or heat pump |
| Refrigerant 13 | Stabilizer 1 | Residential AC or heat pump |
| Refrigerant 14 | Stabilizer 1 | Residential AC or heat pump |
| Refrigerant 15 | Stabilizer 1 | Residential AC or heat pump |
| Refrigerant 16 | Stabilizer 1 | Residential AC or heat pump |
| Refrigerant 17 | Stabilizer 1 | Residential AC or heat pump |
| Refrigerant 18 | Stabilizer 1 | Residential AC or heat pump |
| Refrigerant 19 | Stabilizer 1 | Residential AC or heat pump |
| Refrigerant 20 | Stabilizer 1 | Residential AC or heat pump |
| Refrigerant 21 | Stabilizer 1 | Residential AC or heat pump |
| Refrigerant 22 | Stabilizer 1 | Residential AC or heat pump |
| Refrigerant 23 | Stabilizer 1 | Residential AC or heat pump |
| Refrigerant 24 | Stabilizer 1 | Residential AC or heat pump |
| Refrigerant 25 | Stabilizer 1 | Residential AC or heat pump |

Heat transfer compositions comprise any one of Refrigerants 1 to 25 and Stabilizer 1 and a POE lubricant in Residential AC or a heat pump as follows:

| REFRIGERANT | STABILIZER | LUBRICANT | AIR CONDITIONING SYSTEM |
|---|---|---|---|
| Refrigerant 1 | Stabilizer 2 | POE | Residential AC or heat pump |
| Refrigerant 2 | Stabilizer 2 | POE | Residential AC or heat pump |
| Refrigerant 3 | Stabilizer 2 | POE | Residential AC or heat pump |
| Refrigerant 4 | Stabilizer 2 | POE | Residential AC or heat pump |
| Refrigerant 5 | Stabilizer 2 | POE | Residential AC or heat pump |
| Refrigerant 6 | Stabilizer 2 | POE | Residential AC or heat pump |
| Refrigerant 7 | Stabilizer 2 | POE | Residential AC or heat pump |
| Refrigerant 8 | Stabilizer 2 | POE | Residential AC or heat pump |
| Refrigerant 9 | Stabilizer 2 | POE | Residential AC or heat pump |
| Refrigerant 10 | Stabilizer 2 | POE | Residential AC or heat pump |
| Refrigerant 11 | Stabilizer 2 | POE | Residential AC or heat pump |
| Refrigerant 12 | Stabilizer 2 | POE | Residential AC or heat pump |

-continued

| REFRIGERANT | STABILIZER | LUBRICANT | AIR CONDITIONING SYSTEM |
|---|---|---|---|
| Refrigerant 13 | Stabilizer 2 | POE | Residential AC or heat pump |
| Refrigerant 14 | Stabilizer 2 | POE | Residential AC or heat pump |
| Refrigerant 15 | Stabilizer 2 | POE | Residential AC or heat pump |
| Refrigerant 16 | Stabilizer 2 | POE | Residential AC or heat pump |
| Refrigerant 17 | Stabilizer 2 | POE | Residential AC or heat pump |
| Refrigerant 18 | Stabilizer 2 | POE | Residential AC or heat pump |
| Refrigerant 19 | Stabilizer 2 | POE | Residential AC or heat pump |
| Refrigerant 20 | Stabilizer 2 | POE | Residential AC or heat pump |
| Refrigerant 21 | Stabilizer 2 | POE | Residential AC or heat pump |
| Refrigerant 22 | Stabilizer 2 | POE | Residential AC or heat pump |
| Refrigerant 23 | Stabilizer 2 | POE | Residential AC or heat pump |
| Refrigerant 24 | Stabilizer 2 | POE | Residential AC or heat pump |
| Refrigerant 25 | Stabilizer 2 | POE | Residential AC or heat pump |

Heat transfer compositions comprise any one of Refrigerants 1 to 25 in a low temperature refrigeration system or a medium temperature system as follows:

| REFRIGERANT | REFRIGERATION SYSTEM |
|---|---|
| Refrigerant 1 | low temperature refrigeration or medium temperature refrigeration |
| Refrigerant 2 | low temperature refrigeration or medium temperature refrigeration |
| Refrigerant 3 | low temperature refrigeration or medium temperature refrigeration |
| Refrigerant 4 | low temperature refrigeration or medium temperature refrigeration |
| Refrigerant 5 | low temperature refrigeration or medium temperature refrigeration |
| Refrigerant 6 | low temperature refrigeration or medium temperature refrigeration |
| Refrigerant 7 | low temperature refrigeration or medium temperature refrigeration |
| Refrigerant 8 | low temperature refrigeration or medium temperature refrigeration |
| Refrigerant 9 | low temperature refrigeration or medium temperature refrigeration |
| Refrigerant 10 | low temperature refrigeration or medium temperature refrigeration |
| Refrigerant 11 | low temperature refrigeration or medium temperature refrigeration |
| Refrigerant 12 | low temperature refrigeration or medium temperature refrigeration |
| Refrigerant 13 | low temperature refrigeration or medium temperature refrigeration |
| Refrigerant 14 | low temperature refrigeration or medium temperature refrigeration |
| Refrigerant 15 | low temperature refrigeration or medium temperature refrigeration |
| Refrigerant 16 | low temperature refrigeration or medium temperature refrigeration |
| Refrigerant 17 | low temperature refrigeration or medium temperature refrigeration |
| Refrigerant 18 | low temperature refrigeration or medium temperature refrigeration |
| Refrigerant 19 | low temperature refrigeration or medium temperature refrigeration |
| Refrigerant 20 | low temperature refrigeration or medium temperature refrigeration |

-continued

| REFRIGERANT | REFRIGERATION SYSTEM |
|---|---|
| Refrigerant 21 | low temperature refrigeration or medium temperature refrigeration |
| Refrigerant 22 | low temperature refrigeration or medium temperature refrigeration |
| Refrigerant 23 | low temperature refrigeration or medium temperature refrigeration |
| Refrigerant 24 | low temperature refrigeration or medium temperature refrigeration |
| Refrigerant 25 | low temperature refrigeration or medium temperature refrigeration |

Heat transfer compositions comprise any one of Refrigerants 1 to 25 and Stabilizer 1 in a low temperature refrigeration system or a medium temperature refrigeration system as follows:

| REFRIGERANT | STABILIZER | REFRIGERATION SYSTEM |
|---|---|---|
| Refrigerant 1 | Stabilizer 1 | low temperature refrigeration or medium temperature refrigeration |
| Refrigerant 2 | Stabilizer 1 | low temperature refrigeration or medium temperature refrigeration |
| Refrigerant 3 | Stabilizer 1 | low temperature refrigeration or medium temperature refrigeration |
| Refrigerant 4 | Stabilizer 1 | low temperature refrigeration or medium temperature refrigeration |
| Refrigerant 5 | Stabilizer 1 | low temperature refrigeration or medium temperature refrigeration |
| Refrigerant 6 | Stabilizer 1 | low temperature refrigeration or medium temperature refrigeration |
| Refrigerant 7 | Stabilizer 1 | low temperature refrigeration or medium temperature refrigeration |
| Refrigerant 8 | Stabilizer 1 | low temperature refrigeration or medium temperature refrigeration |

-continued

| REFRIGERANT | STABILIZER | REFRIGERATION SYSTEM |
|---|---|---|
| Refrigerant 9 | Stabilizer 1 | low temperature refrigeration or medium temperature refrigeration |
| Refrigerant 10 | Stabilizer 1 | low temperature refrigeration or medium temperature refrigeration |
| Refrigerant 11 | Stabilizer 1 | low temperature refrigeration or medium temperature refrigeration |
| Refrigerant 12 | Stabilizer 1 | low temperature refrigeration or medium temperature refrigeration |
| Refrigerant 13 | Stabilizer 1 | low temperature refrigeration or medium temperature refrigeration |
| Refrigerant 14 | Stabilizer 1 | low temperature refrigeration or medium temperature refrigeration |
| Refrigerant 15 | Stabilizer 1 | low temperature refrigeration or medium temperature refrigeration |
| Refrigerant 16 | Stabilizer 1 | low temperature refrigeration or medium temperature refrigeration |
| Refrigerant 17 | Stabilizer 1 | low temperature refrigeration or medium temperature refrigeration |
| Refrigerant 18 | Stabilizer 1 | low temperature refrigeration or medium temperature refrigeration |
| Refrigerant 19 | Stabilizer 1 | low temperature refrigeration or medium temperature refrigeration |
| Refrigerant 20 | Stabilizer 1 | low temperature refrigeration or medium temperature refrigeration |
| Refrigerant 21 | Stabilizer 1 | low temperature refrigeration or medium temperature refrigeration |
| Refrigerant 22 | Stabilizer 1 | low temperature refrigeration or medium temperature refrigeration |
| Refrigerant 23 | Stabilizer 1 | low temperature refrigeration or medium temperature refrigeration |
| Refrigerant 24 | Stabilizer 1 | low temperature refrigeration or medium temperature refrigeration |
| Refrigerant 25 | Stabilizer 1 | low temperature refrigeration or medium temperature refrigeration |

Heat transfer compositions comprise any one of Refrigerants 1 to 25, Stabilizer 1, and POE lubricant in a low temperature refrigeration or medium temperature refrigeration system as follows:

| REFRIGERANT | STABILIZER | LUBRICANT | REFRIGERATION SYSTEM |
|---|---|---|---|
| Refrigerant 1 | Stabilizer 1 | POE | low temperature refrigeration or medium temperature refrigeration |
| Refrigerant 2 | Stabilizer 1 | POE | low temperature refrigeration or medium temperature refrigeration |
| Refrigerant 3 | Stabilizer 1 | POE | low temperature refrigeration or medium temperature refrigeration |
| Refrigerant 4 | Stabilizer 1 | POE | low temperature refrigeration or medium temperature refrigeration |
| Refrigerant 5 | Stabilizer 1 | POE | low temperature refrigeration or medium temperature refrigeration |
| Refrigerant 6 | Stabilizer 1 | POE | low temperature refrigeration or medium temperature refrigeration |
| Refrigerant 7 | Stabilizer 1 | POE | low temperature refrigeration or medium temperature refrigeration |
| Refrigerant 8 | Stabilizer 1 | POE | low temperature refrigeration or medium temperature refrigeration |
| Refrigerant 9 | Stabilizer 1 | POE | low temperature refrigeration or medium temperature refrigeration |
| Refrigerant 10 | Stabilizer 1 | POE | low temperature refrigeration or medium temperature refrigeration |
| Refrigerant 11 | Stabilizer 1 | POE | low temperature refrigeration or medium temperature refrigeration |
| Refrigerant 12 | Stabilizer 1 | POE | low temperature refrigeration or medium temperature refrigeration |
| Refrigerant 13 | Stabilizer 1 | POE | low temperature refrigeration or medium temperature refrigeration |
| Refrigerant 14 | Stabilizer 1 | POE | low temperature refrigeration or medium temperature refrigeration |
| Refrigerant 15 | Stabilizer 1 | POE | low temperature refrigeration or medium temperature refrigeration |
| Refrigerant 16 | Stabilizer 1 | POE | low temperature refrigeration or medium temperature refrigeration |

-continued

| REFRIGERANT | STABILIZER | LUBRICANT | REFRIGERATION SYSTEM |
|---|---|---|---|
| Refrigerant 17 | Stabilizer 1 | POE | low temperature refrigeration or medium temperature refrigeration |
| Refrigerant 18 | Stabilizer 1 | POE | low temperature refrigeration or medium temperature refrigeration |
| Refrigerant 19 | Stabilizer 1 | POE | low temperature refrigeration or medium temperature refrigeration |
| Refrigerant 20 | Stabilizer 1 | POE | low temperature refrigeration or medium temperature refrigeration |
| Refrigerant 21 | Stabilizer 1 | POE | low temperature refrigeration or medium temperature refrigeration |
| Refrigerant 22 | Stabilizer 1 | POE | low temperature refrigeration or medium temperature refrigeration |
| Refrigerant 23 | Stabilizer 1 | POE | low temperature refrigeration or medium temperature refrigeration |
| Refrigerant 24 | Stabilizer 1 | POE | low temperature refrigeration or medium temperature refrigeration |
| Refrigerant 25 | Stabilizer 1 | POE | low temperature refrigeration or medium temperature refrigeration |

The present invention thus includes methods of retrofitting existing heat transfer system designed for and containing R-410A refrigerant, without requiring substantial engineering modification of the existing system, particularly without modification of the condenser, the evaporator and/or the expansion valve.

The refrigerants according to the present invention, including in particular any of Refrigerants 1-25 and the heat transfer compositions disclosed herein are provided as a low GWP replacement for the refrigerant R-410A. The heat transfer compositions and the refrigerants of the present invention (including each of Refrigerants 1-25 and all heat transfer compositions containing Refrigerants 1-25) therefore can be used as a replacement refrigerant/heat transfer composition.

The present invention thus also includes methods of using a refrigerant or heat transfer composition of the present invention as a replacement for R-410A, and in particular as a replacement for R-410A in residential air conditioning, without requiring substantial engineering modification of the existing system, particularly without modification of the condenser, the evaporator and/or the expansion valve.

The present invention thus also includes methods of using a refrigerant or heat transfer composition of the present invention as a replacement for R-410A, and in particular as a replacement for R-410A in a chiller system.

The present invention thus also includes methods of using a refrigerant or heat transfer composition of the present invention as a replacement for R-410A, and in particular as a replacement for R-410A in a residential air conditioning system.

There is therefore provided a method of retrofitting an existing heat transfer system that contains R-410A refrigerant, said method comprising replacing at least a portion of the existing R-410A refrigerant with a heat transfer composition of the present invention, including each of Heat Transfer Compositions 1-50. The step of replacing preferably comprises removing at least a substantial portion of, and preferably substantially all of, the existing refrigerant (which can be but is not limited to R-410A) and introducing a heat transfer composition, including each of Heat Transfer Compositions 1-50, without any substantial modification of the system to accommodate the refrigerant of the present invention. Preferably, the method comprises removing at least about 5%, about 10%, about 25%, about 50%, or about 75% by weight of the R-410A from the system and replacing it with the heat transfer compositions of the invention.

Alternatively, the heat transfer composition can be used in a method of retrofitting an existing heat transfer system designed to contain or containing R410A refrigerant, wherein the system is modified for use with a Heat Transfer Composition of the present invention.

Alternatively, the heat transfer composition can be used as a replacement in a heat transfer system which is designed to contain or is suitable for use with R-410A refrigerant.

It will be appreciated that the invention encompasses the use of the heat transfer compositions of the invention as a low Global Warming replacement for R-410A or is used in a method of retrofitting an existing heat transfer system or is used in a heat transfer system which is suitable for use with R-410A refrigerant as described herein.

There is therefore provided a method of replacing the R-410A refrigerant, which would have been used in a particular heat transfer system, with a refrigerant or a heat transfer composition of the present invention, including in particular any of Refrigerants 1-25.

It will be appreciated that when the heat transfer composition is used as a low GWP replacement for R-410A, the heat transfer composition may consist essentially of the refrigerant of the invention. Alternatively, the invention encompasses the use of the refrigerant of the invention as a low GWP replacement for R-410A.

It will be appreciated by the skilled person that when the heat transfer composition is provided for use in a method of retrofitting an existing heat transfer system as described above, the method preferably comprises removing at least a portion of the existing R-410A refrigerant from the system. Preferably, the method comprises removing at least about 5%, about 10%, about 25%, about 50%, or about 75% by weight of the R-410A from the system and replacing it with the heat transfer compositions of the invention.

The heat transfer compositions of the invention, including each of the compostions that comprise Refrigerants 1-25 and each of Heat Transfer Compositions 1-50, may be employed as a replacement in systems which are used or are suitable for use with R-410A refrigerant, such as existing or new heat transfer systems.

The compositions of the present invention exhibit many of the desirable characteristics of R-410A but have a GWP that is substantially lower than that of R-410A while at the same time having operating characteristics i.e. capacity and/or efficiency (COP) that are substantially similar to or substantially match, and preferably are as high as or higher than R-410A. This allows the claimed compositions to replace R-410A in existing heat transfer systems without requiring any significant system modification for example of the condenser, the evaporator and/or the expansion valve. The composition can therefore be used as a direct replacement for R-410A in heat transfer systems.

The heat transfer compositions of the invention, including each of the compostions that comprise Refrigerants 1-25 and each of Heat Transfer Compositions 1-50, therefore preferably exhibits operating characteristics compared with R-410A wherein the efficiency (COP) of the composition is greater than 90% of the efficiency of R-410A in the heat transfer system.

The heat transfer composition of the invention, including each of the compostions that comprise Refrigerants 1-25 and each of Heat Transfer Compositions 1-50, therefore preferably exhibits operating characteristics compared with R-410A wherein the capacity is from 95 to 105% of the capacity of R-410A in the heat transfer system.

It will be appreciated that R-410A is an azeotrope-like composition. Thus, in order for the claimed compositions to be a good match for the operating characteristics of R-410A, the any of the refrigerants included in the heat transfer compositions of the invention, including each of Heat Transfer Compositions 1-50, desirably show a low level of glide. Thus, the refrigerants included in the heat transfer compositions of the invention, including each of Heat Transfer Compositions 1-50, according to invention as described herein may provide an evaporator glide of less than 2° C., preferably less than 1.5° C.

The heat transfer composition of the invention, including each of the compostions that comprise Refrigerants 1-25 and each of Heat Transfer Compositions 1-50, therefore preferably exhibits operating characteristics compared with R-410A wherein the efficiency (COP) of the composition is from 100 to 102% of the efficiency of R-410A in the heat transfer system and wherein the capacity is from 92 to 102% of the capacity of R-410A in the heat transfer system.

Preferably, the heat transfer composition of the invention, including each of the compostions that comprise Refrigerants 1-25 and each of Heat Transfer Compositions 1-50, preferably exhibit operating characteristics compared with R-410A wherein:

- the efficiency (COP) of the composition is from 100 to 105% of the efficiency of R-410A; and/or
- the capacity is from 92 to 102% of the capacity of R-410A.
- in heat transfer systems, in which the compositions of the invention are to replace the R-410A refrigerant.

In order to enhance the reliability of the heat transfer system, it is preferred that the heat transfer composition of the invention, including each of the compostions that comprise Refrigerants 1-25 and each of Heat Transfer Compositions 1-50, further exhibit the following characteristics compared with R-410A:

- the discharge temperature is not greater than 10° C. higher than that of R-410A; and/or
- the compressor pressure ratio is from 98 to 102% of the compressor pressure ratio of R-410A
- in heat transfer systems, in which the composition of the invention is used to replace the R-410A refrigerant.

The existing heat transfer compositions used to replace R-410A are preferably used in air conditioning heat transfer systems including both mobile and stationary air conditioning systems. As used here, the term mobile air conditioning systems means mobile, non-passenger car air conditioning systems, such as air conditioning systems in trucks, buses and trains. Thus, each of the heat transfer compositions as described herein, including each of Heat Transfer Compositions 1-50, can be used to replace R-410A in any one of:

- an air conditioning system including a mobile air conditioning system, particularly air conditioning systems in trucks, buses and trains,
- a mobile heat pump, particularly an electric vehicle heat pump;
- a chiller, particularly a positive displacement chiller, more particularly an air cooled or water cooled direct expansion chiller, which is either modular or conventionally singularly packaged,
- a residential air conditioning system, particularly a ducted split or a ductless split air conditioning system,
- a residential heat pump,
- a residential air to water heat pump/hydronic system,
- an industrial air conditioning system and
- a commercial air conditioning system particularly a packaged rooftop unit and a variable refrigerant flow (VRF) system;
- a commercial air source, water source or ground source heat pump system The heat transfer composition of the invention is alternatively provided to replace R410A in refrigeration systems. Thus, each of the heat transfer compositions as described herein, including the compostions that comprise Refrigerants 1-25 and each of Heat Transfer Compositions 1-50, can be used to replace R10A in in any one of:

- a low temperature refrigeration system,
- a medium temperature refrigeration system,
- a commercial refrigerator,
- a commercial freezer,
- an ice machine,
- a vending machine,
- a transport refrigeration system,
- a domestic freezer,
- a domestic refrigerator,
- an industrial freezer,
- an industrial refrigerator and
- a chiller.

In order to enhance the reliability of the heat transfer system, it is preferred that the composition of the invention further exhibits the following characteristic compared with R-410A: the compressor pressure ratio is from 95 to 105% of the compressor pressure ratio of R-410A in heat transfer systems, in which the composition of the invention is used to replace the R-410A refrigerant.

Each of the heat transfer compositions described herein including each of the compostions that comprise Refrigerants 1-25 and each of Heat Transfer Compositions 1-50, is particularly provided to replace R-410A in an air cooled chiller (with an evaporator temperature in the range of about 0 to about 10° C., particularly about 4.5° C.), particularly an air cooled chiller with a positive displacement compressor, more particular an air cooled chiller with a reciprocating scroll compressor.

Each of the heat transfer compositions described herein including each of the compostions that comprise Refrigerants 1-25 and each of Heat Transfer Compositions 1-50, is particularly provided to replace R-410A in a residential air to water heat pump hydronic system (with an evaporator temperature in the range of about −20 to about 3° C. or about −30 to about 5° C., particularly about 0.5° C.).

Each of the heat transfer compositions described herein including each of Refrigerants 1-25, is particularly provided to replace R-410A in a medium temperature refrigeration system (with an evaporator temperature in the range of about −12 to about 0° C., particularly about −8° C.).

Each of the heat transfer compositions described herein including each of Refrigerants 1-25, is particularly provided to replace R-410A in a low temperature refrigeration system (with an evaporator temperature in the range of about −40 to about −12° C., particularly from about −40° C. to about −23° C. or preferably about −32° C.).

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition of the present invention, including each of Heat Transfer Compositions 1-50.

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition according to the present invention, including each of Heat Transfer Compositions 1-50.

The invention further provides a heat transfer system comprising a compressor, a condenser and an evaporator in fluid communication, and a heat transfer composition in said system, said heat transfer composition comprising any one of Refrigerants 1-25.

Particularly, the heat transfer system is a residential air-conditioning system (with an evaporator temperature in the range of about 0 to about 10° C., particularly about 7° C. for cooling and/or in the range of about −20 to about 3° C. or about −30 to about 5° C., particularly about 0.5° C. for heating) and comprises any one of Refrigerants 1 to 25.

Particularly, the heat transfer system is an air cooled chiller (with an evaporator temperature in the range of about 0 to about 10° C., particularly about 4.5° C.), particularly an air cooled chiller with a positive displacement compressor, more particular an air cooled chiller with a reciprocating or scroll compressor and comprises any one of Refrigerants 1 to 25.

Particularly, the heat transfer system is a residential air to water heat pump hydronic system (with an evaporator temperature in the range of about −20 to about 3° C. or about −30 to about 5° C., particularly about 0.5° C.) and comprises any one of Refrigerants 1 to 25.

The heat transfer system can be a refrigeration system, such as a low temperature refrigeration system, a medium temperature refrigeration system, a commercial refrigerator, a commercial freezer, an ice machine, a vending machine, a transport refrigeration system, a domestic freezer, a domestic refrigerator, an industrial freezer, an industrial refrigerator and a chiller and comprises any one of Refrigerants 1 to 25.

EXAMPLES

The refrigerant compositions identified in Table 2 below as Refrigerants A1, A2 and A3 are refrigerants within the scope of the present invention as described herein. Each of the refrigerants was subjected to thermodynamic analysis to determine its ability to match the operating characteristics of R-4104A in various refrigeration systems. The analysis was performed using experimental data collected for properties of various binary pairs of components used in the composition. The vapor/liquid equilibrium behavior of $CF_3I$ was determined and studied in a series of binary pairs with each of HFC-32 and R125. The composition of each binary pair was varied over a series of relative percentages in the experimental evaluation and the mixture parameters for each binary par were regressed to the experimentally obtained data. Vapor/liquid equilibrium behavior data for the binary pair HFC-32 and HFC-125 available in the National Institute of Science and Technology (NIST) Reference Fluid Thermodynamic and Transport Properties Database software (Refprop 9.1 NIST Standard Database 2013) were used for the Examples. The parameters selected for conducting the analysis were: same compressor displacement for all refrigerants, same operating conditions for all refrigerants, same compressor isentropic and volumetric efficiency for all refrigerants. In each Example, simulations were conducted using the measured vapor liquid equilibrium data. The simulation results are reported for each Example.

TABLE 2

Refrigerants evaluated for Performance Examples

| Refrigerant | HFC-32 (wt %) | HFC-125 (wt %) | $CF_3$ I (wt %) | GWP (100 years) | Flammability |
|---|---|---|---|---|---|
| A1 | 40% | 3.5% | 56.5% | 393 | Non Flammable |
| A2 | 41% | 3.5% | 55.5% | 399 | Non-Flammable |
| A3 | 44% | 3.5% | 52.5% | 420 | Non-Flammable |

Refrigerant A1 comprises 100% by weight of the three compounds listed in Table 2 in their relative percentages and is non-flammable. Refrigerant A2 comprises 100% by weight of the three compounds listed in Table 2 in their relative percentages and is non-flammable. Refrigerant A3 comprises 100% by weight of the three compounds listed in Table 2 in their relative percentages and is non-flammable.

Example 1—Environment/GWP

LCCP was determined for R410, other known refrigerants, and a refrigerant of the present invention and reported in Table 3. In Table 3, the refrigerant having a GWP of 399 is a refrigerant of the present invention. Known refrigerants were used for the GWPs of 1, 150, 250, 750, and 2088. The known refrigerant having a GWP of 2088 is R410A.

Table 3 shows LCCP results in four regions: USA, EU, China and Brazil. As GWP decreases, the direct emissions are lower. However, system efficiency is lower so it consumes more energy and increases the indirect emissions. Therefore, the total emissions (kg-$CO_{2eq}$) first decreases and then increases as GWP decreases. The different energy structures in these regions show values of the optimum GWP that has the lowest total emissions. The number of AC units is also different among these regions: USA and EU have more AC units than China and Brazil. FIG. 1 and the last column of Table 3 shows the total emissions considering all four regions and number of AC units. As GWP decreases, the total emissions decrease until reaching the lowest value for a refrigerant of the present invention having a GWP of 400. In the range of GWP between 250 and 750, the total emissions are very similar. However, total emission significantly increases when GWP is lower than 150 because the indirect emissions increase significantly. So the present invention demonstrates a surprising and unexpected result.

TABLE 3

| GWP (100 years) | LCCP (kg-$CO_{2eq}$) USA | EU | China | Brazil | Overall |
|---|---|---|---|---|---|
| 2088 (R410A) | 22932 | 9967 | 44395 | 5648 | 19676 |
| 750 | 21572 | 8659 | 42907 | 4376 | 18326 |
| 400 (refrigerant of present invention) | 21523 | 8453 | 43112 | 4121 | 18238 |
| 250 | 21700 | 8404 | 43662 | 3997 | 18358 |
| 150 | 22541 | 8622 | 45552 | 4001 | 19044 |
| 1 | 22552 | 8534 | 45727 | 3880 | 19030 |

Example 2—Residential Air-Conditioning System (Cooling)

Residential air-conditioning system is used to supply cool air (12° C.) to buildings in the summer. Refrigerants A1, A2, and A3 were used in a simulation of a residential air-conditioning system as described above and the performance results are in Table 4 below. Residential air condition systems include split air conditioning systems, mini-split air conditioning systems, and window air-conditioning system, and the testing described herein is representative of the results from such systems. The experimental system includes an air-to-refrigerant evaporator (indoor coil), a compressor, an air-to-refrigerant condenser (outdoor coil), and an expansion valve. The operating conditions for the test are: condensing temperature=46° C.; condenser sub-cooling=5.5° C.; evaporating temperature=7° C.; evaporator superheat=5.5° C.; isentropic Efficiency=70%; volumetric efficiency=100%; and temperature rise in Suction Line=5.5° C.

TABLE 4

Performance in Residential Air-Conditioning System (Cooling)

| Refrigerant | Capacity (% of R410A) | Efficiency (% of R410A) | Pressure ratio (% of R410A) | Evaporator glide (° C.) |
|---|---|---|---|---|
| R410A | 100% | 100% | 100% | 0.1 |
| A1 | 92% | 102% | 100% | 4.1 |
| A2 | 93% | 102% | 100% | 3.8 |
| A3 | 95% | 102% | 100% | 3.0 |

Table 4 shows the thermodynamic performance of a residential air-conditioning system compared to R410A system. Refrigerants A1 to A3 show 92% or higher capacity and higher efficiency than R410A. It indicates the system performance is similar to R410A. Refrigerants A1 to A3 show 100% pressure ratio compared to R410A. It indicates the compressor efficiencies are similar to R410A, and no changes on R410A compressor are needed.

Example 3—Residential Heat Pump System (Heating)

Residential heat pump system is used to supply warm air (21.1° C.) to buildings in the winter. Refrigerants A1, A2, and A3 were used in a simulation of a residential heat pump system as described above and the performance results are in Table 5 below. The experimental system includes a residential air-conditioning system, however, when the system is in in the heat pump mode the refrigerant flow is reversed and the indoor coil becomes a condenser and the outdoor coil becomes an evaporator. Residential heat pump systems include split air conditioning systems, mini-split air conditioning systems, and window air-conditioning system, and the testing described herein is representative of the results from such systems. The operating conditions are: condensing temperature=41° C.; condenser sub-cooling=5.5° C.; evaporating temperature=0.5° C.; evaporator superheat=5.5° C.; isentropic efficiency=70%; volumetric efficiency=100%; and temperature rise in suction line=5.5° C.

TABLE 5

Performance in Residential Heat pump System (Heating)

| Refrigerant | Capacity (% of R410A) | Efficiency (% of R410A) | Pressure ratio (% of R410A) | Evaporator glide (° C.) |
|---|---|---|---|---|
| R410A | 100% | 100% | 100% | 0.1 |
| A1 | 89% | 101% | 100% | 4.2 |
| A2 | 90% | 101% | 100% | 3.9 |
| A3 | 92% | 101% | 100% | 3.0 |

Table 5 shows the thermodynamic performance of a residential heat pump system compared to R410A system. The capacity of Refrigerant A1 can be recovered with a larger compressor. Refrigerants A2 and A3 show 90% or higher capacity and higher efficiency than R410A. It indicates the system performance is similar to R410A. Refrigerants A1 to A3 show 100% pressure ratio compared to R410A. It indicates the compressor efficiencies are similar to R410A, and no changes on R410A compressor are needed.

Example 4—Commercial Air-Conditioning System—Chiller

Commercial air-conditioning system (chiller) is used to supply chilled water (7° C.) to large buildings such as office and hospital, etc., and depending on the specific application, the chiller system may be running all year long. The testing described herein is representative of the results from such systems. Refrigerants A1, A2, and A3 were used in a simulation of a commercial air-conditioning system as described above and the performance results are in Table 6 below. The operating conditions are: condensing temperature=46° C.; condenser sub-cooling=5.5° C.; evaporating temperature=4.5° C.; evaporator superheat=5.5° C.; isentropic efficiency=70%; volumetric efficiency=100%; and temperature rise in suction line=2° C.

TABLE 6

Performance in Commercial Air-Conditioning System—Air-Cooled Chiller

| Refrigerant | Capacity (% of R410A) | Efficiency (% of R410A) | Pressure ratio (% of R410A) | Evaporator glide (° C.) |
|---|---|---|---|---|
| R410A | 100% | 100% | 100% | 0.1 |
| A1 | 92% | 102% | 100% | 4.1 |
| A2 | 93% | 102% | 100% | 3.8 |
| A3 | 95% | 102% | 100% | 3.0 |

Table 6 shows the thermodynamic performance of a commercial air-conditioning system compared to R410A system. Refrigerants A1 to A3 show 92% or higher capacity and higher efficiency than R410A. It indicates the system performance is similar to R410A. Refrigerants A1 to A3 show 100% pressure ratio compared to R410A. It indicates the compressor efficiencies are similar to R410A, and no changes on R410A compressor are needed.

Example 5—Residential Air-to-Water Heat Pump Hydronic System

A residential air-to-water heat pump hydronic system is used to supply hot water (50° C.) to buildings for floor heating or similar applications in the winter is tested. Refrigerants A1, A2, and A3 were used in a simulation of a residential heat pump system as described above and the performance results described herein are representative of the results from such systems and are reported in Table 7 below. The operating conditions are: condensing temperature=60° C. (corresponding indoor leaving water temperature=about 50° C.); condenser sub-cooling=5.5° C.; evaporating temperature=0.5° C. (corresponding outdoor ambient temperature=about 8.3° C.); evaporator superheat=5.5° C.; isentropic efficiency=70%; volumetric Efficiency=100%; and temperature rise in suction line=2° C.

TABLE 7

Performance in Residential Air-to-Water Heat Pump Hydronic System

| Refrigerant | Capacity (% of R410A) | Efficiency (% of R410A) | Pressure ratio (% of R410A) | Evaporator glide (° C.) |
|---|---|---|---|---|
| R410A | 100% | 100% | 100% | 0.1 |
| A1 | 93% | 103% | 100% | 3.9 |
| A2 | 94% | 103% | 100% | 3.6 |
| A3 | 96% | 103% | 99% | 2.8 |

Table 7 shows the thermodynamic performance of a residential heat pump system compared to R410A system. Refrigerants A1 to A3 show 93% or higher capacity and higher efficiency than R410A. It indicates the system performance is similar to R410A. Refrigerants A1 to A2 show 100% pressure ratio compared to R410A. It indicates the compressor efficiencies are similar to R410A, and no changes on R410A compressor are needed. Further, Refrigerant A2 shows a 100% pressure ratio compared to R-410A, which indicates that the compressor efficiencies are sufficiently similar to R-410A that no changes to the compressor used with R-410A are needed.

Example 6—Medium Temperature Refrigeration System

A medium temperature refrigeration system is used to chill the food or beverage such as in refrigerator and bottle cooler is tested. The experimental system includes an air-to-refrigerant evaporator to chill the food or beverage, a compressor, an air-to-refrigerant condenser to exchange heat with the ambient air, and an expansion valve. Refrigerants A1, A2, and A3 were used in a simulation of a medium temperature refrigeration system as described above and the performance results are in Table 8 below. The operating conditions: condensing temperature=40.6° C.; condenser sub-cooling=0° C.; (system with receiver); evaporating temperature=−6.7° C.; evaporator superheat=5.5° C.; isentropic efficiency=70%; volumetric efficiency=100%; and degree of superheat in the suction line=19.5° C.

TABLE 8

Performance in Medium Temperature Refrigeration System

| Refrigerant | Capacity (% of R410A) | Efficiency (% of R410A) | Pressure ratio (% of R410A) | Evaporator glide (° C.) |
|---|---|---|---|---|
| R410A | 100% | 100% | 100% | 0.1 |
| A1 | 94% | 104% | 100% | 4.1 |
| A2 | 94% | 104% | 100% | 3.7 |
| A3 | 97% | 104% | 99% | 2.9 |

Table 8 shows the thermodynamic performance of a medium temperature refrigeration system compared to R410A system. Refrigerants A1 to A3 show 94% or higher capacity and higher efficiency than R410A. It indicates the system performance is similar to R410A. Refrigerants A1 to A2 show 100% pressure ratio compared to R410A. It indicates the compressor efficiencies are similar to R410A, and no changes on R410A compressor are needed. Further, Refrigerant A2 shows a 100% pressure ratio compared to R-410A, which indicates that the compressor efficiencies are sufficiently similar to R-410A that no changes to the compressor used with R-410A are needed.

Example 7—Low Temperature Refrigeration System

Low temperature refrigeration system is used to freeze the food such as in ice cream machine and freezer. The experimental system includes an air-to-refrigerant evaporator to cool or freeze the food or beverage, a compressor, an air-to-refrigerant condenser to exchange heat with the ambient air, and a expansion valve. The testing described herein is representative of the results from such systems. Refrigerants A1, A2, and A3 were used in a simulation of a low temperature refrigeration system as described above and the performance results are in Table 9 below. The operating conditions: condensing temperature=40.6° C.; condenser sub-cooling=0° C. (system with receiver); evaporating temperature=−28.9° C.[; degree of superheat at evaporator outlet=5.5° C.; isentropic efficiency=65%; volumetric efficiency=100%; and degree of superheat in the suction line=44.4° C.

TABLE 9

Performance in Low Temperature Refrigeration System

| Refrigerant | Capacity (% of R410A) | Efficiency (% of R410A) | Pressure ratio (% of R410A) | Evaporator glide (° C.) |
|---|---|---|---|---|
| R410A | 100% | 100% | 100% | 0.1 |
| A1 | 96% | 105% | 100% | 4.0 |
| A2 | 97% | 105% | 99% | 3.7 |
| A3 | 99% | 105% | 99% | 2.7 |

Table 9 shows the thermodynamic performance of a low temperature refrigeration system compared to R410A system. Refrigerants A1 to A3 show 96% or higher capacity and higher efficiency than R410A. It indicates the system performance is similar to R410A. Refrigerants A1 to A3 show 99% or 100% pressure ratio compared to R410A. It indicates the compressor efficiencies are similar to R410A, and no changes on R410A compressor are needed.

Example 8. Commercial Air-Conditioning System—Packaged Rooftops

A packaged rooftop commercial air conditioning system configured to supply cooled or heated air to buildings is tested. The experimental system includes a packaged rooftop air-conditioning/heat pump systems and has an air-to-refrigerant evaporator (indoor coil), a compressor, an air-to-refrigerant condenser (outdoor coil), and an expansion valve. The testing described herein is representative of the results from such systems. The operating conditions for the test are:

1. Condensing temperature=about 46° C. (corresponding outdoor ambient temperature=about 35° C.)
2. Condenser sub-cooling=about 5.5° C.
3. Evaporating temperature=about 7° C. (corresponding indoor ambient temperature=26.7° C.)
4. Evaporator Superheat=about 5.5° C.
5. Isentropic Efficiency=70%
6. Volumetric Efficiency=100%
7. Temperature Rise in Suction Line=5.5° C.

The performance results from the testing are reported in Table 8 below:

TABLE 8

Performance in Commercial Air-Conditioning System - Packaged Rooftops

| Refrigerant | Capacity | Efficiency | Pressure ratio | Evaporator glide (° C.) |
|---|---|---|---|---|
| R-410A | 100% | 100% | 100% | 0.1 |
| A1 | 89% | 101% | 100% | 4.2 |
| A2 | 90% | 101% | 100% | 3.9 |
| A3 | 92% | 101% | 100% | 3.0 |

Table 8 shows the thermodynamic performance of a rooftop commercial air conditioning system operating with Refrigerant A1, A2 and A3 of the present invention compared to R-410A Refrigerants A2 and A3 show 90% or higher capacity and higher efficiency than R410A. It indicates the system performance is similar to R410A. The capacity of Refrigerant A2 and A3 can be recovered with a larger compressor. Refrigerants A1 to A3 show 100% pressure ratio compared to R410A. It indicates the compressor efficiencies are similar to R410A, and no significant changes in R410A compressor design are needed.

Example 9—Commercial Air-Conditioning System—Variable Refrigerant Flow Systems A commercial air-conditioning system with variable refrigerant flow is configured to supply cooled or heated air to buildings is tested. The system includes multiple (4 or more) air-to-refrigerant evaporators (indoor coils), a compressor, an air-to-refrigerant condenser (outdoor coil), and an expansion valve. The conditions described herein is representative of the operating conditions from such systems. The operating conditions are listed below:

1. Condensing temperature=about 46° C., Corresponding outdoor ambient temperature=35° C.
2. Condenser sub-cooling=about 5.5° C.
3. Evaporating temperature=about 7° C. (corresponding indoor ambient temperature=26.7° C.)
4. Evaporator Superheat=about 5.5° C.
5. Isentropic Efficiency=70%
6. Volumetric Efficiency=100%
7. Temperature Rise in Suction Line=5.5° C.

TABLE 9

Performance in Commercial Air-Conditioning System - Variable Refrigerant Flow Systems

| Refrigerant | Capacity (% of R410A) | Efficiency (% of R410A) | Pressure ratio (% of R410A) | Evaporator glide (° C.) |
|---|---|---|---|---|
| R410A | 100% | 100% | 100% | 0.1 |
| A1 | 89% | 101% | 100% | 4.2 |
| A2 | 90% | 101% | 100% | 3.9 |
| A3 | 92% | 101% | 100% | 3.0 |

Table 9 shows the thermodynamic performance of a rooftop commercial air conditioning system operating with Refrigerant A1, A2 and A3 of the present invention compared to R-410A Refrigerants A2 and A3 show 90% or higher capacity and higher efficiency than R410A. It indicates the system performance is similar to R410A. The capacity of Refrigerant A2 and A3 can be recovered with a larger compressor. Refrigerants A1 to A3 show 100% pressure ratio compared to R410A. It indicates the compressor efficiencies are similar to R410A, and no significant changes in R410A compressor design are needed.

Example 10—Stabilizers for Heat Transfer Compositions Comprising Refrigerant and Lubricant Heat transfer compositions of the present invention are tested in accordance with ASHRAE Standard 97—"Sealed Glass Tube Method to Test the Chemical Stability of Materials for Use within Refrigerant Systems" to simulate long-term stability of the heat transfer compositions by accelerated aging. After testing, the level of halides is considered to reflect the stability of the refrigerant under conditions of use in the heat transfer composition and total acid number (TAN) is considered to reflect the stability of the lubricant stability under conditions of use in the heat transfer composition.

The following experiment is carried out to show the effect of the addition of stabilizers according to the present invention on a refrigerant/lubricant composition. Sealed tubes are prepared containing 50% by weight of the indicated refrigerant and 50% by weight of the indicated lubricant, each of which has been degassed. Each tube contains a coupon of steel, copper, aluminum and bronze. The stability is tested by placing the sealed tube in an oven maintained at about 175° C. for 14 days. In each case the lubricants tested are an ISO 32 POE having a viscosity at 40° C. of about 32 cSt (Lubricant A) an ISO 68 POE having a viscosity at 40° C. of about 68 cSt (Lubricant B), with each lubricant having a moisture content of less than 300 ppm. The following refrigerants described in Table 10A are tested:

TABLE 10A

| Refrigerant | Moisture, ppm |
|---|---|
| A1 | less than 30 |
| A2 | less than 30 |
| A3 | less than 30 |

The test is run for each lubricant and refrigerant pair in the absence of any stabilizer, and the results are as follows:

| |
|---|
| Lubricant Visual - opaque or black |
| Metals Visual - dull |
| Solids Present - Yes |
| Halides > 100 ppm |
| TAN > 10 mgKOH/g |

The following stabilizers described in Table 10B, with the weight percent in the table being the weight percent of the indicated stabilizer in the stabilizer package, are tested in an amount based on the total weight of the stabilizer plus refrigerant of from about 1.5% to less than about 10%.

TABLE 10B

| Stabilizer | Alkylated Napthalene 5 (wt %) | BHT (wt %) | Franasene wt %) | Isobutylene (wt %) |
|---|---|---|---|---|
| A | 100 | 0 | 0 | 0 |
| B | 0 | 100 | 0 | 0 |
| C | 0 | 0 | 100 | 0 |
| D | 0 | 0 | 0 | 100 |
| E | 33.3 | 33.3 | 33.3 | 0 |
| F | 33.3 | 33.3 | 0 | 33.3 |

The results of the testing with these stabilizers and lubricant A1, A2 and A3 are reported below in Table 10C

TABLE 10C

| | | TEST RESULTS | | | | |
|---|---|---|---|---|---|---|
| Refrigerant No. | Stabilizer | Visual | Metals | Solids | Halides, ppm | Tan, mbKOH/g |
| A1 | A | Clear, colorless | Shiny | No | <300 ppm | <3 |
| A1 | B | Clear, colorless | Shiny | No | <300 ppm | <3 |
| A1 | C | Clear, colorless | Shiny | No | <300 ppm | <3 |
| A1 | D | Clear, colorless | Shiny | No | <300 ppm | <3 |
| A1 | E | Clear, colorless | Shiny | No | <300 ppm | <3 |
| A1 | F | Clear, colorless | Shiny | No | <300 ppm | <3 |
| A2 | A | Clear, colorless | Shiny | No | <300 ppm | <3 |
| A2 | B | Clear, colorless | Shiny | No | <300 ppm | <3 |
| A2 | C | Clear, colorless | Shiny | No | <300 ppm | <3 |
| A2 | D | Clear, colorless | Shiny | No | <300 ppm | <3 |
| A2 | E | Clear, colorless | Shiny | No | <300 ppm | <3 |
| A2 | F | Clear, colorless | Shiny | No | <300 ppm | <3 |
| A3 | A | Clear, colorless | Shiny | No | <300 ppm | <3 |
| A3 | B | Clear, colorless | Shiny | No | <300 ppm | <3 |
| A3 | C | Clear, colorless | Shiny | No | <300 ppm | <3 |
| A3 | D | Clear, colorless | Shiny | No | <300 ppm | <3 |
| A3 | E | Clear, colorless | Shiny | No | <300 ppm | <3 |
| A3 | F | Clear, colorless | Shiny | No | <300 ppm | <3 |

This testing shows that the lubricant in each of these tests was clear and colorless, the metals were shiny (unchanged), and there were no solids present, the halide and TAN levels were in acceptable limits, all of which indicates that the stabilizers were effective.

Example 11—Miscibility with POE Oil

Miscibility of ISO POE-32 oil (having a viscosity at about 32 cSt at a temperature of 40° C.) is tested for different weight ratios of lubricant and refrigerant and different temperatures for R-410A refrigerant and for Refrigerant A2 as specified in Table 1 for Example 1 above. The results of this testing are reported in Table 11 below:

TABLE 11

| Liquid Refrigerant Mass Percentage in the Refrigerant and Lubricant | R-410A Miscibility Temperature Range | | Refrigerant A of the present |
|---|---|---|---|
| Mixture, % | Lower Limit, ° C. | Upper Limit, ° C. | invention |
| 60 | about −26 | NA | Fully miscible |
| 70 | about −23 | about 55 | Fully miscible |
| 80 | about −22 | about 48 | Fully miscible |
| 90 | about −31 | about 50 | Fully miscible |

As can be seen from the table above, R-410A is immiscible with POE oil below about −22° C., and R-410A cannot therefore be used in low temperature refrigeration applications without make provisions to overcome the accumulation of POE oil in the evaporator. Furthermore, R-410A is immiscible with POE oil above 50° C., which will cause problems in the condenser and liquid line (e.g. the separated POE oil will be trapped and accumulated) when R-410A is used in high ambient conditions. Conversely, applicants have surprisingly and unexpectedly found that refrigerants of the present invention are fully miscible with POE oil across a temperature range of −40° C. to 80° C., thus providing a substantial and unexpected advantage when used in such systems.

Example 12—Residential Air-Conditioning System (Cooling) with Sequestration and Heat Transfer Composition with Stabilizer Example 2 is repeated, except an oil separator is included in the system and several sequestration materials consisting independently of Sequestration Materials 1-4 are included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 13—Residential Heat Pump System (Heating) with Sequestration and Heat Transfer Composition with Stabilizer Example 3 is repeated, except an oil separator is included in the system and several sequestration materials consisting independently of Sequestration Materials 1-4 included in the liquid portion of the oil separator. The heat transfer composition includes Luricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 14—Commercial Air-Conditioning System (Chiller) with Sequestration and Heat Transfer Composition with Stabilizer Example 4 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 15—Residential Air-to-Water Heat Pump Hydronic System with Sequestration and Heat Transfer Composition with Stabilizer Example 5 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 16—Medium Temperature Refrigeration System with Sequestration and Heat Transfer Composition with Stabilizer Example 6 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 17—Low Temperature Refrigeration System with Sequestration and Heat Transfer Composition with Stabilizer Example 7 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 18—Commercial Air-Conditioning System—Packaged Rooftops with Sequestration and Heat Transfer Composition with Stabilizer Example 8 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 19—Commercial Air-Conditioning System—Variable Refrigerant Flow Systems with Sequestration and Heat Transfer Composition with Stabilizer Example 9 is repeated, except an oil separator is included in the system and several sequestration materials consisting independently of Sequestration Materials 1-4 included in the liquid portion of the oil separator. The heat transfer composition includes Lubricant 1 and Stabilizer 1 in amounts as described herein. The system operated as indicated in Example 2 in each case and operates to indicate high levels of stability such that operation with acceptable levels of stability, as per the testing indicated in Examples 10 and 20-30 hereof, occurs for at least 1 year.

Example 20—Sequestration Material Comprising Silver Zeolite

The ability of a zeolite comprising silver to act as a sequestration material was tested. The zeolite tested was UPO IONSIV D7310-C, available form Honeywell UOP. The openings have a size across their largest dimension of from about 15 to about 35 Å.

A blend of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a sealed tube, and then heated for 2 days at 190° C. These conditions caused breakdown of the refrigerant and the lubricant. The sealed tubes were then opened and samples of the oil were taken.

The oil sample was then placed in Fischer-Porter tubes with the zeolite. The amount of dry zeolite relative to the sample (lubricant) was measured. The tubes were then maintained at either 15° C. or 50° C. for 114 hours (4.75 days). The tubes were shaken every two hours to ensure proper mixing of the zeolite and the sample.

The Total Acid Number (TAN), iodide ppm and fluoride ppm of the sample were measured at the start (i.e. after degradation of the $CF_3I$ and POE oil, and before combination with the zeolite), and at the end (i.e. after combination with the zeolite, and at the end of the 114 hours at 15° C. or 50° C.). TAN, fluoride and iodide concentration were measured according to the same methods as descried in Example 10.

The results of the tests are set out in Table 20.

TABLE 20

| Effect of zeolite on TAN, fluoride and iodide concentration | | | | | | | |
|---|---|---|---|---|---|---|---|
| | Amount of zeolite relative to sample | TAN | | Fluoride (ppm) | | Iodide (ppm) | |
| Temp. | (pphl) | Start | End | Start | End | Start | End |
| 15° C. | 4.8 pphl | 30.0 | 29.4 | 94.8 | 61.5 | 57.4 | 14.2 |
| | 20.5 pphl | 30.0 | 24.7 | 94.8 | 46.4 | 57.4 | 5.5 |
| 50° C. | 5.4 pphl | 30.0 | 29.7 | 94.8 | 45.2 | 57.4 | 8.1 |
| | 22.1 pphl | 30.0 | 23.3 | 94.8 | 39.2 | 57.4 | 0.1 |

*—pphl means parts by weight per hundred parts of lubricant

The above tests demonstrate the ability of the zeolite to effectively "recover" a composition of POE oil and a $CF_3I$ refrigerant after it has degraded.

The results demonstrate that the zeolite was able to reduce the iodide and the fluoride level of the degraded sample at both 15° C. and 50° C. when using either about 5 pphl zeolite or about 21 pphl zeolite. However, the zeolite performed better at 50° C. than at 15° C., and at about 21 pphl zeolite than at about 5 pphl zeolite. Surprisingly, very little iodide was detected at about 21 pphl zeolite at 50° C.

The results also show that, at a concentration of about 21 pphl zeolite, the TAN was reduced at both 15° C. and at 50° C.

Example 21

The ability of an anion exchange resin to act as a sequestration material was tested.

Two different anion exchange resins were tested.

First Resin

The first resin was a strongly basic (type 1) anion exchange resin with chloride exchangeable ions (Dowex® 1×8 chloride form).

| | |
|---|---|
| Product Name | Dowex ® 1x8 chloride form |
| Composition | Moisture content, 43-48% |
| Limit | 66° C. max. temp. |
| Cross-linkage | 8% |
| Matrix | Styrene-divinylbenzene (gel) |
| Particle size | 50-100 mesh |
| Operating pH | 0-14 |
| Capacity | 1.2 meq/mL total capacity |

The first resin was used without modification.

Second Resin

The second resin was a strongly basic (type 1) anion exchange resin with chloride exchangeable ions (Dowex® 1×8 chloride form).

| | |
|---|---|
| Product Name | Dowex ® 1x8 chloride form |
| Composition | Moisture content, 43-48% |
| Limit | 66° C. max. temp. |
| Cross-linkage | 8% |
| Matrix | Styrene-divinylbenzene (gel) |
| Particle size | 50-100 mesh |
| Operating pH | 0-14 |
| Capacity | 1.2 meq/mL total capacity |

The second resin was converted from the chloride form to the hydroxide form prior to use in the following example by slowly washing the resin for at least 1 hour with 5 to 10 bed volumes of 4% NaOH, followed by washing with deionized water until the pH of the effluent is 7, ±0.5. The pH was measured using litmus paper.

Method and Results

A blend of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a sealed tube, and then heated for 2 days at 190° C. These conditions caused breakdown of the refrigerant and the lubricant. The sealed tubes were then opened and samples of the oil were taken.

The sample was then placed in Fischer-Porter tubes with the anion exchange resin. The amount of dry resin relative to the sample was measured. The tubes were then maintained at either 15° C. or 50° C. for 114 hours (4.75 days). The tubes were shaken every two hours to ensure proper mixing of the resin and the sample.

The Total Acid Number (TAN), iodide ppm and fluoride ppm of the sample were measured at the start (i.e. after degradation of the $CF_3I$ and POE oil, and before combination with the resin), and at the end (i.e. after combination with the resin, and at the end of the 114 hours at 15° C. or 50° C.). TAN, fluoride and iodide concentration were measured according to the same methods as Example 10.

The results are set out in Table 21 below.

TABLE 21

| Effect of anion exchange resin on TAN, fluoride and iodide concentration | | | | | | | | |
|---|---|---|---|---|---|---|---|---|
| | | Amount of IE relative to sample | TAN | | Fluoride (ppm) | | Iodide (ppm) | |
| Material | Temp. | (lubricant) | Start | End | Start | End | Start | End |
| First resin | 15° C. | 3.9 pphl | 30.0 | 30.7 | 94.8 | 65.5 | 57.4 | 32.4 |
| | | 16.0 pphl | 30.0 | 30.9 | 94.8 | 61.9 | 57.4 | 19.9 |
| | 50° C. | 4.5 pphl | 30.0 | 31.1 | 94.8 | 55.2 | 57.4 | 25.8 |
| | | 16.7 pphl | 30.0 | 39.4 | 94.8 | 44.7 | 57.4 | 17.5 |
| Second resin | 15° C. | 3.8 pphl | 30.0 | 26.0 | 94.8 | 54.3 | 57.4 | 15.0 |
| | | 15.2 pphl | 30.0 | 14.5 | 94.8 | 44.3 | 57.4 | 4.5 |
| | 50° C. | 4.8 pphl | 30.0 | 26.8 | 94.8 | 46.2 | 57.4 | 7.6 |
| | | 16.7 pphl | 30.0 | 13.1 | 94.8 | 22.6 | 57.4 | 2.5 |

*—pphl means parts by weight per hundred parts of lubricant

The above tests demonstrate the ability of anion exchange resins to effectively "recover" a composition of POE oil and a $CF_3I$ refrigerant after it has degraded.

The results demonstrate that both resins were able to reduce the iodide and the fluoride level of the degraded sample at both 15° C. and 50° C. when using either about 4 pphl resin or about 16 pphl resin. Both resins performed better at 50° C. than at 15° C., and at about 16 pphl resin than about 4 pphl zeolite.

The second resin was able to reduce the TAN of the sample at both temperatures (i.e. 15° C. and at 50° C.), and at both concentrations of resin (i.e. at about 4 pphl and about 16 pphl resin).

Example 22

Example 22 is repeated except that the following two anion resins were used:

A—An industrial grade weak base anion exchange resin sold under the trade designation Amberlyst A21 (Free Base) having the following characteristics:

| Product Name | Amberlyst A21 |
|---|---|
| Composition | Moisture content, 58-62% |
| Limit | 100° C. max. temp. |
| Ionic Form | Free Base (FB) |
| Matrix | Macroporous |
| Particle size | 490-690 μm |
| Concentration of active sites | >4.6 eq/kg<br>>1.3 eq/L |

B—An industrial grade weak basic anion exchange resin sold under the trade designation Amberlyst A22 having the following characteristics:

| Product Name | Amberlyst A22 |
|---|---|
| Composition | Moisture content, 40-50% |
| Limit | 100° C. max. temp. |
| Ionic Form | Free Base (FB) |
| Structure | Styrene-divinylbenzene |
| Matrix | Macroporous |
| Particle size | 475-600 μm |
| Capacity | >1.7 eq/L |

Each of these resins were found to be effect to remove and/or reduce the above-noted materials.

Example 23

The ability of combination of anion exchange resin and zeolite to act as a sequestration material was tested.

Anion Exchange Resin

The resin was a strongly basic (type 1) anion exchange resin with hydroxyl exchangeable ions (Dowex® Marathon™ A, hydroxide form).

| Product Name | Dowex ® Marathon ™ A, hydroxide form |
|---|---|
| Moisture | 60-72% |
| Matrix | Styrene-divinylbenzene (gel) |
| Particle size | 23-27 mesh |
| Capacity | 1.0 meq/mL by wetted bed volume |

The resin was used without modification.

Zeolite

The zeolite tested was UPO IONSIV D7310-C, available form Honeywell UOP. The openings have a size across their largest dimension of from about 15 to about 35 Å.

Method and Results

A blend of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a sealed tube, and then heated for 2 days at 175° C. These conditions caused breakdown of the refrigerant and the lubricant. The sealed tubes were then opened and samples of the oil (i.e., lubricant) were taken.

The lubricant sample was then placed in Fischer-Porter tubes with the combination of anion exchange resin and zeolite. The amount of dry resin and zeolite relative to the sample were measured. The tubes were then maintained at about 50° C. for 192 hours (8 days). The tubes were shaken every two hours to ensure proper mixing of the resin and the sample.

The Total Acid Number (TAN), iodide ppm and fluoride ppm of the oil were measured at the start (i.e. after degradation of the $CF_3I$ and POE oil, and before combination with the resin and zeolite), and at the end (i.e. after combination with the resin and zeolite, and at the end of the 192 hours at 50° C.). TAN, fluoride and iodide concentration were measured according to the same methods as Example 1.

The results are set out in Table 23 below.

TABLE 23

Effect of anion exchange resin and zeolite on TAN, fluoride and iodide concentration

| Temp. | Zeolite:Ion Exchange (IE) | TAN Start | TAN End | Fluoride (ppm) Start | Fluoride (ppm) End | Iodide (ppm) Start | Iodide (ppm) End |
|---|---|---|---|---|---|---|---|
| 50° C. | 100% IE | 8.71 | 3.20 | 23.3 | 5.4 | 26.9 | <0.05 |
| | 25%:75% | 8.71 | <0.05 | 23.3 | 0.8 | 26.9 | <0.05 |
| | 50%:50% | 8.71 | 0.14 | 23.3 | 3.1 | 26.9 | <0.05 |
| | 75%:25% | 8.71 | 0.96 | 23.3 | 5.4 | 26.9 | <0.05 |
| | 100% Zeolite | 8.71 | 2.93 | 23.3 | 5.3 | 26.9 | <0.05 |

The above tests demonstrate the ability of combination of anion exchange resins and zeolite to effectively "recover" a composition of POE oil and a $CF_3I$ refrigerant after it has degraded. The results demonstrate that both resins were able to reduce the iodide and the fluoride level of the degraded sample at 50° C. when using different ratios of anion exchange resin and zeolite. The zeolite to ion-exchange weight 25:75 showed maximum reduction in the TAN of the sample and also showed highest decrease in iodide and fluoride content (ppm).

Example 24

The level of removal of fluoride, iodide and TAN reduction as a function of the amount of zeolite as a percentage of the heat transfer composition being treated was studied The zeolite tested was UPO IONSIV D7310-C, available form Honeywell UOP. The openings have a size across their largest dimension of from about 15 to about 35 Å.

A blend of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a sealed tube, and then heated for 2 days at 175° C. These conditions caused breakdown of the refrigerant and the lubricant. The sealed tubes were then opened and samples of the oil were taken.

A portion of the lubricant sample produced after the breakdown according to the preceeding paragraph was then filled into 5 Parr Cells, with each of the cells having a different amount (by weight) of zeolite based on the weight of the lubricant placed into the cell. The Parr Cells were then maintained at 50° C. and the material in each cell was tested every 24 hours for 15 days. The Parr Cells were shaken every day to ensure proper mixing of the zeolite and the lubricant.

The Total Acid Number (TAN), iodide ppm and fluoride ppm of the oil were measured at the start (i.e. after degradation of the $CF_3I$ and POE oil, and before combination with the zeolite), and after every 24 hours (i.e. after combination with the zeolite, at 50° C.) for 15 days.

The results of the tests are set out in Table 5 below:

TABLE 24

| Effect of zeolite on TAN, fluoride and iodide concentration | | | | | | | | | | | |
|---|---|---|---|---|---|---|---|---|---|---|---|
| | | | TAN | | | Fluoride (ppm) | | | Iodide (ppm) | | |
| Material | Temp. | Zeolite (Pphl) | Start | 5 days | 15 days | Start | 5 days | 15 days | Start | 5 days | 15 days |
| Zeolite | 50° C. | 1 | 4.5 | 4.4 | 4.6 | 7.4 | 1.5 | 0.96 | 370 | 240 | 33 |
| | | 5 | 4.5 | 3.6 | 3.5 | 7.4 | <0.8 | <0.8 | 370 | 130 | 13 |
| | | 10 | 4.5 | 2.6 | 2.6 | 7.4 | <0.8 | <0.8 | 370 | 49 | <4 |
| | | 15 | 4.5 | 2.0 | 2.2 | 7.4 | <0.8 | <0.8 | 370 | 26 | <4 |
| | | 20 | 4.5 | 1.8 | 2 | 7.4 | <0.8 | <0.8 | 370 | 38 | <4 |

The above tests demonstrate the ability of the zeolite to effectively "recover" a composition of lubricant, and in particular POE oil, and a $CF_3I$ refrigerant after it has degraded.

The results indicate that amounts of zeolite greater than 10 pphl are more effective in reducing iodide levels to non-detectable limits, and amount of zeolite material greater than 5 pphl is more effective in reducing the fluoride levels to non-detectable limits. The results also show that amount of zeolite greater than 15 pphl is most effective in reducing the TAN.

Example 25—Preferred Ion Exchange Materials

The ability of an industrial grade weakly base anion exchange adsorbent resin Amberlyst A21 (Free Base) to act as a sequestration material was tested. Weak Base Anion Resin are in the free base form and they are functionalized with a tertiary amine (uncharged). Tertiary amine contains a free lone pair of electrons on the Nitrogen—it gets readily protonated in presence of an acid. The ion exchange resin is protonated by the acid, then attracts and binds the anionic counter ion for full acid removal, without contributing any additional species back into solution.

Applicants have found that Amberlyst A21 is an excellent material for use in accordance with the present invention. It has a macroporous structure makes it physically very stable and resistant to breakage in the present methods and systems, and ii can withstand high flow rates of the refrigeration system over a period of lifetime.

Example 26

The ability of an industrial grade weakly base anion exchange adsorbent resin Amberlyst A21 (Free Base) to act as a sequestration material was tested. Weak Base Anion Resin are in the free base form and they are functionalized with a tertiary amine (uncharged). Tertiary amine contains a free lone pair of electrons on the Nitrogen—it gets readily protonated in presence of an acid. The ion exchange resin is protonated by the acid, then attracts and binds the anionic counter ion for full acid removal, without contributing any additional species back into solution. The matrix of Amberlyst A21 is macroporous. Its macroporous structure makes it physically very stable and resistant to breakage. It can withstand high flow rates of the refrigeration system over a period of lifetime. An industrial grade weak base anion exchange resin sold under the trade designation Amberlyst A21 (Free Base) having the following characteristics:

| | |
|---|---|
| Product Name | Amberlyst A21 |
| Composition | Moisture content, 58-62% |
| Limit | 100° C. max. temp. |
| Ionic Form | Free Base (FB) |
| Matrix | Macroporous |
| Particle size | 490-690 μm |
| Concentration of active sites | >4.6 eq/kg<br>>1.3 eq/L |

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with the Amberlyst A21. The amount of dry Amberlyst A21 relative to the sample was measured. The parr cells were then maintained at either 50° C. for 20 days. The cells were shaken each day to ensure proper mixing of the Amberlyst A21 and the sample.

The Total Acid Number (TAN), iodide ppm and fluoride ppm of the sample were measured at the start (i.e. after degradation of the $CF_3I$ and POE oil, and before combination with the Amberlyst A21), and at the end (i.e. after combination with the Amberlyst A21). TAN, fluoride and iodide concentration were measured according to the methods as described in the application.

The results of the tests are set out in Table 26.

TABLE 26

| Effect of Amberlyst A21 on TAN, fluoride and iodide concentration | | | | | | | |
|---|---|---|---|---|---|---|---|
| | Amount of Amberlyst A21 relative to oil | TAN | | Fluoride (ppm) | | Iodide (ppm) | |
| Temp. | sample (wt %) | Start | End | Start | End | Start | End |
| 50° C. | 20% | 7.2 | 1.4 | 21 | 1.6 | 620 | 130 |
| | 30% | 7.2 | 0.6 | 21 | 5.2 | 620 | <4 |
| | 40% | 7.2 | 0.4 | 21 | <4 | 620 | <4 |

The above tests demonstrate the ability of the Amberlyst A21 to effectively "recover" a composition of POE oil and a $CF_3I$ refrigerant after it has degraded.

The results demonstrate that the Amberlyst A21 was able to reduce the iodide and the fluoride level below detectable limits of the degraded sample at 50° C. when using 30 wt % Amberlyst A21 and above.

Example 27

The ability of an industrial grade weakly base anion exchange adsorbent resin Amberlyst A22 (Free Base) to act as a sequestration material was tested. Weak Base Anion Resin are in the free base form and they are functionalized with a tertiary amine (uncharged). Tertiary amine contains a free lone pair of electrons on the Nitrogen—it gets readily protonated in presence of an acid. The ion exchange resin is protonated by the acid, then attracts and binds the anionic counter ion for full acid removal, without contributing any additional species back into solution. Its macroporous structure makes it physically very stable and resistant to breakage. It can withstand high flow rates of the refrigeration system over a period of lifetime. An industrial grade weak basic anion exchange resin sold under the trade designation Amberlyst A22 having the following characteristics:

| | |
|---|---|
| Product Name | Amberlyst A22 |
| Composition | Moisture content, 40-50% |
| Limit | 100° C. max. temp. |
| Ionic Form | Free Base (FB) |
| Structure | Styrene-divinylbenzene |
| Matrix | Macroporous |
| Particle size | 475-600 μm |
| Capacity | >1.7 eq/L |

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with the Amberlyst A22. The amount of dry Amberlyst A22 relative to the sample was measured. The parr cells were then maintained at either 50° C. for 20 days. The cells were shaken each day to ensure proper mixing of the Amberlyst A22 and the sample.

The Total Acid Number (TAN), iodide ppm and fluoride ppm of the sample were measured at the start (i.e. after degradation of the $CF_3I$ and POE oil, and before combination with the Amberlyst A22), and at the end (i.e. after combination with the Amberlyst A22). TAN, fluoride and iodide concentration were measured according to the methods as described in the application.

The results of the tests are set out in Table 27.

TABLE 27

Effect of Amberlyst A22 on TAN, fluoride and iodide concentration

| Temp. | Amount of Amberlyst A22 relative to oil sample (wt %) | TAN Start | TAN End | Fluoride (ppm) Start | Fluoride (ppm) End | Iodide (ppm) Start | Iodide (ppm) End |
|---|---|---|---|---|---|---|---|
| 50° C. | 10% | 4.3 | 1.3 | 6.0 | <0.8 | 170 | 140 |
| | 20% | 4.3 | 0.8 | 6.0 | <0.8 | 170 | 74 |

The above tests demonstrate the ability of the Amberlyst A22 to effectively "recover" a composition of POE oil and a $CF_3I$ refrigerant after it has degraded.

The results demonstrate that the Amberlyst A22 was able to reduce the iodide and the fluoride level of the degraded sample at 50° C. when using 10 wt % and 30 wt % of Amberlyst A22.

Example 28

The ability of an industrial grade weakly base anion exchange adsorbent resin Amberlite IRA96 to act as a sequestration material was tested. Weak Base Anion Resin are in the free base form and are functionalized with a tertiary amine (uncharged). Tertiary amine contains a free lone pair of electrons on the Nitrogen—it gets readily protonated in presence of an acid. The ion exchange resin is protonated by the acid, then attracts and binds the anionic counter ion for full acid removal, without contributing any additional species back into solution. Its macroporous structure makes it physically very stable and resistant to breakage. It can withstand high flow rates of the refrigeration system over a period of lifetime. The high porosity of this resin allows efficient adsorption of large organic molecules. An industrial grade weak basic anion exchange resin sold under the trade designation Amberlite IRA96 having the following characteristics:

| | |
|---|---|
| Product Name | Amberlite IRA96 |
| Composition | Moisture content, 59-65% |
| Limit | 100° C. max. temp. |
| Ionic Form | Free Base (FB) |
| Structure | Macroporous |
| Matrix | Styrene divinylbenzene copolymer |
| Functional Group | Tertiary amine |
| Particle size | 630-830 μm |
| Concentration of active sites | >1.25 eq/L |

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with the AmberlitelRA96. The amount of dry AmberlitelRA96 relative to the sample was measured. The parr cells were then maintained at either 50° C. for 20 days. The cells were shaken each day to ensure proper mixing of the AmberlitelRA96 and the sample.

The Total Acid Number (TAN), iodide ppm and fluoride ppm of the sample were measured at the start (i.e. after degradation of the $CF_3I$ and POE oil, and before combination with the AmberlitelRA96), and at the end (i.e. after combination with the AmberlitelRA96). TAN, fluoride and iodide concentration were measured according to the methods as described in the application.

The results of the tests are set out in Table 28.

TABLE 28

| Effect of Amberlite on TAN, fluoride and iodide concentration | | | | | | | |
|---|---|---|---|---|---|---|---|
| | Amount of AmberliteIRA96 relative to oil | TAN | | Fluoride (ppm) | | Iodide (ppm) | |
| Temp. | sample (wt %) | Start | End | Start | End | Start | End |
| 50° C. | 20% | 6.3 | 0.2 | 30 | <0.8 | 1000 | 130 |
| | 30% | 6.3 | <0.2 | 30 | <0.8 | 1000 | <4 |
| | 40% | 6.3 | <0.2 | 30 | <0.8 | 1000 | <4 |

The above tests demonstrate the ability of the AmberlitelRA96 to effectively "recover" a composition of POE oil and a $CF_3I$ refrigerant after it has degraded.

The results demonstrate that the AmberlitelRA96 was able to reduce the iodide and the fluoride level below detectable limits of the degraded sample at 50° C. when using 30 wt % AmberlitelRA96 and above.

Example 29

The ability of an industrial grade activated alumina F200 to act as a sequestration material was tested.

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with industrial grade activated alumina F200. The amount of activated alumina relative to the sample was measured. The parr cells were then maintained at either 50° C. for 20 days. The cells were shaken each day to ensure proper mixing of the sample.

The Total Acid Number (TAN), iodide ppm and fluoride ppm of the sample were measured at the start (i.e. after degradation of the $CF_3I$ and POE oil, and before exposure to F200), and at the end (i.e. after exposure to F200). TAN, fluoride and iodide concentration were measured per the methods described in the application.

The results of the tests are set out in Table 29A.

TABLE 29

| Effect of Activated Alumina F200 on TAN, fluoride and iodide concentration | | | | | | | |
|---|---|---|---|---|---|---|---|
| | Amount of F200 relative to oil sample | TAN | | Fluoride (ppm) | | Iodide (ppm) | |
| Temp. | (wt %) | Start | End | Start | End | Start | End |
| 50° C. | 20% | 7.2 | 1.6 | 21 | 1.4 | 620 | 72 |
| | 30% | 7.2 | 1.0 | 21 | 1.0 | 620 | 37 |
| | 40% | 7.2 | 1.3 | 21 | 0.9 | 620 | 64 |

Example 30

The ability of combination of a Amberlyst A21 and Zeolite IONSIV D7310-C as sequestration material was tested.

A mixture of 80 wt % POE oil (POE ISO 32, Emkarate RL 32-3MAF) which comprises a primary anti-oxidant stabilizer BHT in an amount of about 1000 ppm, and 20 wt % $CF_3I$ was placed in a cylinder, and then heated for 2 days at 175° C. These conditions caused breakdown of the refrigerant and the lubricant. The cylinder was then opened and samples of the oil were taken.

The sample was then placed in parr cells with the sequestration material. The amount of sequestration material relative to the sample was 20% by weight. The parr cells were then maintained at either 50° C. for 20 days. The cells were shaken each day to ensure proper mixing of the sample.

The Total Acid Number (TAN), iodide ppm and fluoride ppm of the sample were measured at the start (i.e. after degradation of the $CF_3I$ and POE oil, and before exposure to sequestration material), and at the end (i.e. after exposure to sequestration material). TAN, fluoride and iodide concentration were measured per the methods described in the application. The results of the tests are set out in Table 30.

TABLE 30

| Effect of Amberlyst A21 and Zeolite IONSIV D7310-C combination on TAN, fluoride and iodide concentration | | | | | | | |
|---|---|---|---|---|---|---|---|
| | A21:Zeolite | TAN | | Fluoride (ppm) | | Iodide (ppm) | |
| Temp | (by weight) | Start | End | Start | End | Start | End |
| 50° C. | 100% A21 | 19 | 3.1 | 100 | 2.4 | 570 | 9 |
| | 85:15 | 19 | 3.4 | 100 | 1.8 | 570 | <4 |
| | 75:25 | 19 | 3.8 | 100 | 2.8 | 570 | <4 |
| | 65:35 | 19 | 4.0 | 100 | 1.8 | 570 | <4 |
| | 50:50 | 19 | 8.0 | 100 | 2.4 | 570 | <4 |
| | 100% Zeolite | 19 | 12.0 | 100 | 5.6 | 570 | <4 |

Although the invention has been described with reference to preferred compositions, it will be understood by those skilled in the art that various changes may be made and equivalents substituted for elements thereof without departing from the scope of the invention. In addition, many modifications may be made to adapt to a particular situation or material to the teachings of the invention without departing from the essential scope thereof. Therefore, it is intended that the invention not be limited to the particular compositions disclosed, but that the invention will include all compositions falling within the scope of the appended claims or any claims added later.

Numbered Embodiment 1

A refrigerant comprising at least about 97% by weight of the following three compounds, with each compound being present in the following relative percentages:

39 to 45% by weight difluoromethane (HFC-32), 1 to 4% by weight pentafluoroethane (HFC-125), and 51 to 57% by weight trifluoroiodomethane ($CF_3I$).

Numbered Embodiment 2

The refrigerant of numbered embodiment 1 wherein the refrigerant of three compounds is:

about 41 to about 43% by weight difluoromethane (HFC-32), 1 to 4% by weight pentafluoroethane (HFC-125), and about 53 to about 56% by weight trifluoroiodomethane ($CF_3I$).

Numbered Embodiment 3

The refrigerant of numbered embodiment 1 wherein the refrigerant of three compounds is:

41%±1% by weight difluoromethane (HFC-32), 3.5%±0.5% by weight pentafluoroethane (HFC-125), and 55.5%±0.5% by weight trifluoroiodomethane ($CF_3I$).

Numbered Embodiment 4

The refrigerant of numbered embodiment 1 wherein the refrigerant of three compounds is:

41% by weight difluoromethane (HFC-32), 3.5% by weight pentafluoroethane (HFC-125), and 55.5% by weight trifluoroiodomethane ($CF_3I$).

Numbered Embodiment 5

The refrigerant as claimed in numbered embodiments 1 to 4 wherein the refrigerant comprises at least about 98.5% by weight of said three compounds.

Numbered Embodiment 6

The refrigerant as claimed in numbered embodiments 1 to 4 wherein the refrigerant comprises at least about 99.5% by weight of said three components.

Numbered Embodiment 7

A refrigerant consisting essentially of:

39 to 45% by weight difluoromethane (HFC-32), 1 to 4% by weight pentafluoroethane (HFC-125), and 51 to 57% by weight trifluoroiodomethane ($CF_3I$).

Numbered Embodiment 8

The refrigerant of claim 7, consisting essentially of:

about 41 to about 43% by weight difluoromethane (HFC-32), 1 to 4% by weight pentafluoroethane (HFC-125), and about 53 to about 56% by weight trifluoroiodomethane ($CF_3I$).

Numbered Embodiment 9

The refrigerant of numbered embodiment 7 or numbered embodiment 8 consisting essentially of:

41%±1% by weight difluoromethane (HFC-32), 3.5%±0.5% by weight pentafluoroethane (HFC-125), and 55.5%±0.5% by weight trifluoroiodomethane ($CF_3I$).

Numbered Embodiment 10

The refrigerant of numbered embodiment 7 or numbered embodiment 8 consisting essentially of 41% by weight difluoromethane (HFC-32), 3.5% by weight pentafluoroethane (HFC-125), and 55.5% by weight trifluoroiodomethane ($CF_3I$).

Numbered Embodiment 11

A refrigerant consisting of:

39 to 45% by weight difluoromethane (HFC-32), 1 to 4% by weight pentafluoroethane (HFC-125), and 51 to 57% by weight trifluoroiodomethane ($CF_3I$).

Numbered Embodiment 12

The refrigerant of numbered embodiment 11, consisting of:

about 41 to about 43% by weight difluoromethane (HFC-32), 1 to 4% by weight pentafluoroethane (HFC-125), and about 53 to about 56% by weight trifluoroiodomethane ($CF_3I$).

Numbered Embodiment 13

The refrigerant of numbered embodiment 11 or numbered embodiment 12 consisting of:

41%±1% by weight difluoromethane (HFC-32), 3.5%±0.5% by weight pentafluoroethane (HFC-125), and 55.5%±0.5% by weight trifluoroiodomethane ($CF_3I$).

Numbered Embodiment 14

The refrigerant of numbered embodiment 11 or numbered embodiment 12 consisting of:

41% by weight difluoromethane (HFC-32), 3.5% by weight pentafluoroethane (HFC-125), and 55.5% by weight trifluoroiodomethane ($CF_3I$).

Numbered Embodiment 15

A heat transfer composition comprising a refrigerant of any one of numbered embodiments 1 to 14.

Numbered Embodiment 16

The heat transfer composition as claimed in numbered embodiment 15, wherein the refrigerant comprises greater than 40% by weight of the composition.

Numbered Embodiment 17

The heat transfer composition as claimed in numbered embodiment 15 wherein the refrigerant comprises greater than 50% by weight of the composition.

Numbered Embodiment 18

The heat transfer composition as claimed in numbered embodiment 15, wherein the refrigerant comprises greater than 60% by weight of the composition.

Numbered Embodiment 19

The heat transfer composition as claimed in numbered embodiment 15, wherein the refrigerant comprises greater than 70% by weight of the composition.

Numbered Embodiment 20

The heat transfer composition as claimed in numbered embodiment 15, wherein the refrigerant comprises greater than 80% by weight of the composition.

Numbered Embodiment 21

The heat transfer composition as claimed in numbered embodiment 15, wherein the refrigerant comprises greater than 90% by weight of the composition.

Numbered Embodiment 22

The heat transfer composition of any one of numbered embodiments 15 to 21 wherein said heat transfer composition further comprising an alkylated naphthalene stabilizer.

Numbered Embodiment 23

The heat transfer composition of any one of numbered embodiments 15 to 22 wherein said heat transfer composition further comprising a stabilizer comprising and/or a phenol-based compound.

Numbered Embodiment 24

The heat transfer composition of numbered embodiments 22 to 23 wherein heat transfer composition further comprises a stabilizer comprising an epoxide.

Numbered Embodiment 25

The heat transfer composition of any one of numbered embodiments 24 wherein the phenol compound is provided in the heat transfer composition in an amount of greater than 0, preferably from 0.0001% by weight to about 5% by weight, more preferably 0.001% by weight to about 2.5% by weight, most preferably from 0.01% to about 1% by weight.

Numbered Embodiment 26

The heat transfer composition of numbered embodiment 25 wherein the phenol compound is BHT, wherein said BHT is present in an amount of from about 0.0001% by weight to about 5% by weight based on the weight of heat transfer composition.

Numbered Embodiment 27

The heat transfer composition numbered embodiment 26 further comprising a lubricant selected from polyol esters (POEs), mineral oil and alkylbenzenes (ABs).

Numbered Embodiment 28

The heat transfer composition of numbered embodiment 27 wherein the lubricant is a polyol ester (POE).

Numbered Embodiment 29

A method of cooling in a heat transfer system comprising an evaporator, a condenser and a compressor, the process comprising the steps of i) condensing a heat transfer composition of any one of numbered embodiments 21 to 29 and ii) evaporating the composition in the vicinity of body or article to be cooled; wherein the evaporator temperature of the heat transfer system is in the range of from about −40° C. to about −10° C.

Numbered Embodiment 30

A method of heating in a heat transfer system comprising an evaporator, a condenser and a compressor, the process comprising the steps of i) condensing a heat transfer composition of any one of numbered embodiment 21 to 29, in the vicinity of a body or article to be heated and ii) evaporating the composition; wherein the evaporator temperature of the heat transfer system is in the range of about −20° C. to about 3° C.

Numbered Embodiment 31

A method of heating in a heat transfer system comprising an evaporator, a condenser and a compressor, the process comprising the steps of i) condensing a heat transfer composition in any one of numbered embodiments 21 to 29, in the vicinity of a body or article to be heated and ii) evaporating the composition; wherein the evaporator temperature of the heat transfer system is in the range of about −30° C. to about 5° C.

Numbered Embodiment 32

A method of cooling in a heat transfer system comprising an evaporator, a condenser and a compressor, the process comprising the steps of i) condensing a heat transfer composition of any one of numbered embodiments 21 to 29 and ii) evaporating the composition in the vicinity of body or article to be cooled wherein the heat transfer system is a refrigeration system.

Numbered Embodiment 33

The method of numbered embodiment 32, wherein the refrigeration system is a low temperature refrigeration system or a medium temperature refrigeration system.

Numbered Embodiment 34

The method of numbered embodiment 33, wherein the refrigeration system is a low temperature refrigeration system.

Numbered Embodiment 35

The method of numbered embodiment 33, wherein the refrigeration system is a medium temperature refrigeration system.

Numbered Embodiment 36

The method of numbered embodiment 35, wherein the refrigeration system is a medium temperature refrigeration system (with an evaporator temperature in the range of about −12 to about 0° C., particularly about −8° C.).

Numbered Embodiment 37

The method of numbered embodiment 34, wherein the refrigeration system is a low temperature refrigeration system (with an evaporator temperature in the range of about −40 to about −12° C., particularly about −23° C. or preferably about −32° C.).

Numbered Embodiment 38

A method of replacing an existing refrigerant contained in a heat transfer system comprising removing at least a portion of said existing refrigerant from said system, said existing refrigerant being R-410a and replacing at least a portion of said existing refrigerant by introducing into said system, a refrigerant as claimed in any one of numbered embodiments 1 to 14 or a heat transfer composition as claimed in any one of numbered embodiments 21 to 29.

Numbered Embodiment 39

The method of numbered embodiment 38, wherein the portion of the existing R410A refrigerant is at least about 5% by weight of the R410A from the system.

Numbered Embodiment 40

The method of numbered embodiment 38, wherein the portion of the existing R-410A refrigerant is at least about 50% by weight of the R-410A from the system.

Numbered Embodiment 41

The method of numbered embodiment 38, wherein the portion of the existing R-410A refrigerant is about 100% by weight of the R-410A from the system.

Numbered Embodiment 42

The use of refrigerant of any one of numbered embodiments 1 to 14 in an air conditioning system.

Numbered Embodiment 43

The use of numbered embodiment 42 wherein the air conditioning system is residential air conditioning.

Numbered Embodiment 44

The use of numbered embodiment 42 wherein the air conditioning system is a residential heat pump.

Numbered Embodiment 451

The use of numbered embodiment 58 wherein the air conditioning system is a chiller.

Numbered Embodiment 46

A refrigerant of any one of numbered embodiments 1 to 14 wherein said refrigerant (a) has a COP matching or exceeding the efficiency of R410A; and (b) has a capacity of greater than 90% of the capacity of R410A.

Numbered Embodiment 47

The refrigerant of numbered embodiment 46, wherein the refrigerant is provided to replace the R410A refrigerant in a system.

Numbered Embodiment 48

The refrigerant of numbered embodiment 47, wherein the refrigerant has a discharge temperature which is not greater than 10° C. higher than that of R-410A in a heat transfer system in which the refrigerant is used to replace the R-410A refrigerant.

Numbered Embodiment 49

The refrigerant of numbered embodiments 48, wherein the refrigerant has a compressor pressure ratio of from 95 to 105% of the compressor pressure ratio of R-410A in a heat transfer system, in which the refrigerant is used to replace the R-410A refrigerant.

Numbered Embodiment 50

The refrigerant of any one of numbered embodiments 1 to 14 or 46-49 having a GWP over a time period of 100 years of not greater than 427.

Numbered Embodiment 51

The refrigerant of any one of numbered embodiments 1 to 14 or 46-49 which is non-flammable as determined in accordance with the Non-Flammability Test.

Numbered Embodiment 52

The refrigerant of any one of numbered embodiments 1 to 14 or 46-49 which is non-flammable as determined in accordance with ASTM standard E-681-2009 Standard Test Method for Concentration Limits of Flammability of Chemicals (Vapors and Gases) at conditions described in ASHRAE Standard 34-2016 Designation and Safety Classification of Refrigerants and described in Appendix B1 to ASHRAE Standard 34-2016.

The invention claimed is:

1. A refrigerant consisting of the following three compounds, with each compound being present in the following relative percentages:

39% to 45% by weight difluoromethane (HFC-32),

1% to 4% by weight pentafluoroethane (HFC-125), and

51% to 57% by weight trifluoroiodomethane (CF3I), wherein the refrigerant is non-flammable.

2. The refrigerant of claim 1 consisting of:

about 41% to about 43% by weight difluoromethane (HFC-32),

1% to 4% by weight pentafluoroethane (HFC-125), and about 53% to about 56% by weight trifluoroiodomethane (CF3I).

3. The refrigerant of claim 2 comprising:

41%+/−0.5% by weight difluoromethane (HFC-32), 3.5%+/−0.5% by weight pentafluoroethane (HFC-125), and 55.5%+/−0.5% by weight trifluoroiodomethane (CF3I).

4. The refrigerant of claim 2 consisting of:

41%±1% by weight difluoromethane (HFC-32), 3.5%±0.5% by weight pentafluoroethane (HFC-125), and 55.5%±0.5% by weight trifluoroiodomethane (CF3I).

5. The refrigerant of claim 2 consisting of the following three compounds, with each compound being present in the following relative percentages:

41% by weight difluoromethane (HFC-32), 3.5% by weight pentafluoroethane (HFC-125), and 55.5% by weight trifluoroiodomethane (CF3I).

6. A method of cooling in a heat transfer system comprising an evaporator, a condenser and a compressor, the process comprising the steps of:

i) condensing a refrigerant consisting of the following three compounds, with each compound being present in the following relative percentages:

39% to 45% by weight difluoromethane (HFC-32),

1% to 4% by weight pentafluoroethane (HFC-125), and

51% to 57% by weight trifluoroiodomethane ($CF_3I$) and ii) evaporating said refrigerant in the vicinity of the body or article to be cooled; wherein the temperature of the refrigerant in the evaporator is in the range of from about −40° C. to about 10° C.

7. The method of claim 6 wherein the temperature of the refrigerant in the evaporator is in the range of from about −30° C. to about 5° C.

8. The method of claim 6 wherein the temperature of the refrigerant in the evaporator is in the range of from about −40° C. to about −10° C.

9. The method of claim 6 wherein the system is a residential air conditioning system and wherein the temperature of the refrigerant in the evaporator is in the range of from about 0° C. to about 10° C.

10. The method of claim 6 wherein the system is a chiller system and wherein the temperature of the refrigerant in the evaporator is in the range of from about 0° C. to about 10° C.

11. The method of claim 6 wherein the system is a low temperature refrigeration system and wherein the temperature of the refrigerant in the evaporator is in the range of from about −40° C. to about −12° C.

12. A method of retrofitting an existing heat transfer system that contains R-410A refrigerant comprising:

(a) removing at least a portion of said R-410A refrigerant from the system; and (b) introducing into the heat transfer system a refrigerant consisting of the following three compounds, with each compound being present in the following relative percentages:

a. 39% to 45% by weight difluoromethane (HFC-32), b. 1% to 4% by weight pentafluoroethane (HFC-125), and c. 51% to 57% by weight trifluoroiodomethane (CF3I).

13. The method of claim 12 wherein said removing step comprises removing at least about 50% of the R410 refrigerant from the system.

14. The method of claim 12 wherein said system is a chiller system.

15. The method of claim 12 wherein said system is a residential air conditioning system.

16. The method of claim 12 wherein said method does not include any substantial modification of the system to accommodate said refrigerant introduced in step (b).

17. The method of claim 16 wherein said method does not include modification of the condenser, the evaporator or the expansion valve to accommodate said refrigerant introduced in step (b).

* * * * *